United States Patent
Itano et al.

(10) Patent No.: US 11,773,307 B2
(45) Date of Patent: Oct. 3, 2023

(54) REFRIGERANT-CONTAINING COMPOSITION, USE THEREOF, REFRIGERATING METHOD USING SAME, AND REFRIGERATOR COMPRISING SAME

(71) Applicant: DAIKIN INDUSTRIES, LTD., Osaka (JP)

(72) Inventors: Mitsushi Itano, Osaka (JP); Hitomi Kuroki, Osaka (JP); Shun Ohkubo, Osaka (JP); Tatsumi Tsuchiya, Osaka (JP); Kenji Gobou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/049,440

(22) PCT Filed: Apr. 25, 2019

(86) PCT No.: PCT/JP2019/017757
§ 371 (c)(1),
(2) Date: Oct. 21, 2020

(87) PCT Pub. No.: WO2019/208722
PCT Pub. Date: Oct. 31, 2019

(65) Prior Publication Data
US 2021/0261841 A1  Aug. 26, 2021

(30) Foreign Application Priority Data

Apr. 25, 2018 (JP) .................. 2018-084356

(51) Int. Cl.
| | | |
|---|---|---|
| C09K 5/04 | (2006.01) | |
| C10M 105/38 | (2006.01) | |
| C10M 107/24 | (2006.01) | |
| C10M 107/34 | (2006.01) | |
| F25B 13/00 | (2006.01) | |
| C10N 40/30 | (2006.01) | |

(52) U.S. Cl.
CPC ........... C09K 5/045 (2013.01); C10M 105/38 (2013.01); C10M 107/24 (2013.01); C10M 107/34 (2013.01); F25B 13/00 (2013.01); C09K 2205/106 (2013.01); C09K 2205/122 (2013.01); C09K 2205/126 (2013.01); C09K 2205/40 (2013.01); C10M 2207/2835 (2013.01); C10M 2209/043 (2013.01); C10M 2209/1033 (2013.01); C10N 2040/30 (2013.01)

(58) Field of Classification Search
CPC ........ C09K 2205/126; C09K 2205/106; C09K 23/017; C09K 5/045; C09K 2205/122; C09K 2205/40; F25B 13/00; F25B 9/006; F25B 9/008; C10M 2207/2835; C10M 2209/043; C10M 2209/1033; C10M 171/008; C10M 2207/283; C10M 2209/103; C10M 105/38; C10M 107/24; C10M 107/34; C10N 2040/30; C10N 2020/101; C10N 2020/106
USPC ............................................... 252/67, 68, 69
See application file for complete search history.

(56) References Cited

U.S. PATENT DOCUMENTS

| | | | |
|---|---|---|---|
| 6,183,660 | B1 | 2/2001 | Omure et al. |
| 6,187,219 | B1 | 2/2001 | Omure et al. |
| 2016/0333244 | A1 | 11/2016 | Fukushima |
| 2017/0369754 | A1 | 12/2017 | Nishida |
| 2018/0086959 | A1 | 3/2018 | Fukushima |
| 2018/0371303 | A1 | 12/2018 | Itano et al. |
| 2020/0165500 | A1* | 5/2020 | Minor .................... C09K 5/045 |
| 2021/0108120 | A1 | 4/2021 | Itano et al. |
| 2021/0189208 | A1* | 6/2021 | Itano .................... F25B 9/006 |
| 2022/0073802 | A1* | 3/2022 | Itano .................... F25B 5/02 |

FOREIGN PATENT DOCUMENTS

| | | |
|---|---|---|
| CN | 111989380 | 11/2020 |
| JP | 3-287688 | 12/1991 |
| JP | 05-500071 | 1/1993 |
| JP | 05-509113 | 12/1993 |
| JP | 2016-028119 | 2/2016 |
| JP | 2016-505662 | 2/2016 |
| JP | 2019-189676 | 10/2019 |
| WO | 91/05027 | 4/1991 |
| WO | 92/01762 | 2/1992 |
| WO | WO-9602606 A1 * 2/1996 ............. C09K 5/045 |
| WO | 2014/085973 | 6/2014 |
| WO | 2016/114217 | 7/2016 |
| WO | 2017/086328 | 5/2017 |
| WO | 2017/151488 | 9/2017 |
| WO | WO-2017151488 A1 * 9/2017 ............... C09K 5/04 |

OTHER PUBLICATIONS

Extended European Search Report dated Dec. 23, 2021 in European Patent Application No. 19793219.7.
International Search Report dated Aug. 6, 2019 in International (PCT) Application No. PCT/JP2019/017757.

* cited by examiner

*Primary Examiner* — Douglas J McGinty
(74) *Attorney, Agent, or Firm* — Wenderoth, Lind & Ponack, L.L.P.

(57) ABSTRACT

The present disclosure addresses the problem of providing a refrigerant composition that has a low GWP and a refrigerating capacity equivalent to that of R404A, which is currently widely used. As a solution to the problem, the present disclosure provides a composition containing carbon dioxide and a mixture of fluorinated hydrocarbons, the mixture containing difluoromethane (R32), pentafluoroethane (R125), 2,3,3,3-tetrafluoropropene (R1234yf), 1,1,1,2-tetrafluoroethane (R134a), and carbon dioxide ($CO_2$) in specific concentrations.

8 Claims, 9 Drawing Sheets

Partially enlarged view

Partially enlarged view

100% Cap. (relative to R410A)

REFRIGERANT-CONTAINING COMPOSITION, USE THEREOF, REFRIGERATING METHOD USING SAME, AND REFRIGERATOR COMPRISING SAME

TECHNICAL FIELD

The present disclosure relates to a composition containing a refrigerant, use of the composition, a refrigeration method using the composition, and a refrigerating machine comprising the composition.

BACKGROUND ART

In recent year, a mixture of fluorinated hydrocarbons that contain no chlorine in their molecular structure, such as difluoromethane ($CH_2F_2$, R32, boiling point: −52° C.), pentafluoroethane ($CF_3CHF_2$, R125, boiling point: −48° C.), 1,1,1-trifluoroethane ($CF_3CH_3$, R143a, boiling point: −47° C.), 1,1,1,2-tetrafluoroethane ($CF_3CH_2F$, R134a, boiling point: −26° C.), 1,1-difluoroethane ($CHF_2CH_3$, R152a, boiling point: −24° C.), and 2,3,3,3-tetrafluoropropene ($CF_3CF=CH_2$, R1234yf, boiling point: −29° C.), have been used as refrigerants for air conditioners, refrigerating machines, refrigerators, and the like.

Among the above fluorinated hydrocarbons, a binary mixed refrigerant of R32/R125 in which their proportions are 50/50 mass % (R410A), a ternary mixed refrigerant of R32/R125/R134a in which their proportions are 23/25/52 mass % (R407C), a ternary mixed refrigerant of R125/143a/R134a in which their proportions are 44/52/4 mass % (R404A), etc., have been proposed. R410A and R404A are currently widely used respectively as a refrigerant for freezing and as a refrigerant for freezing and refrigerated storage.

For example, Patent Literature (PTL) 1 reports a refrigerant composition containing difluoromethane (R32) and pentafluoroethane (R125). Patent Literature (PTL) 2 and Patent Literature (PTL) 3 report a refrigerant composition containing pentafluoroethane (R125), 1,1,1-trifluoroethane (R143a), and 1,1,1,2-tetrafluoroethane (R134a). Patent Literature (PTL) 4 reports a refrigerant composition comprising difluoromethane (R32), 1,1,1,3-tetrafluoropropene (HFO-1234ze), n-butane, and isobutane, the composition being for use as an alternative for R410A. Patent Literature (PTL) 5 reports a refrigerant composition comprising trifluoroethylene (HFO-1123), 2,3,3,3-tetrafluoropropene (R1234yf), and difluoromethane (R32), the composition being for use as an alternative composition for R410A.

CITATION LIST

Patent Literature

PTL 1: JPH05-500071A
PTL 2: JPH05-509113A
PTL 3: JPH03-287688A
PTL 4: JP2016-028119A
PTL 5: JP2016-505662A

SUMMARY OF INVENTION

Technical Problem

The global warming potential (GWP) of R410A is as high as 2088. In particular, the GWP of R404A is as high as 3922; this is equivalent to that of $CHClF_2$ (R22), which is one of the chlorine-containing fluorinated hydrocarbons.

An object of the present disclosure is to provide a refrigerant that has a refrigerating capacity equivalent to that of R410A, has a low GWP, and is non-flammable.

Solution to Problem

Item 1. A composition comprising a refrigerant, the refrigerant comprising $CO_2$, difluoromethane (R32), pentafluoroethane (R125), 2,3,3,3-tetrafluoro-1-propene (R1234yf), and 1,1,1,2-tetrafluoroethane (R134a), wherein when the mass % of $CO_2$ based on the sum of $CO_2$, R32, R125, R1234yf, and R134a in the refrigerant is x, the mass % of R1234yf based on the sum of R1234yf and R134a is r, and the mass % of R32, the mass % of R125, and the mass % of the sum of R1234yf and R134a based on the sum of $CO_2$, R32, R125, R1234yf, and R134a are respectively represented by a, b, and c, the refrigerant satisfies the following requirements (1) or (2):

(1) $4.2 > x \geq 2.8$;
 $75 \geq r \geq 0$; and coordinates (a, b, c) in a ternary composition diagram whose vertices are a point of (100−x) mass % of R32, a point of (100−x) mass % of R125, and a point of (100−x) mass % of the sum of R1234yf and R134a are within a triangular region surrounded by line segments that connect the following points:

point A [(0.0086x−0.0748)r+0.5x+55.38, (−0.0126x+0.106)r+0.9357x+23.4, 100−a−b−x],
point B [(−0.0077x−0.0756)r−3.0143x+65.26, (0.0126x+0.0392)r+(−0.4x+27.08), 100−a−b−x], and
point C [(−0.0154x−0.042)r−1.4214x+60.8, (0.0171x+0.004)r−2.7857x+33.8, 100−a−b−x], or
on the line segments, or (2) $5.5\% \geq x \geq 4.2\%$;
 $75 \geq r \geq 0$; and coordinates (a, b, c) in a ternary composition diagram whose vertices are a point of (100−x) mass % of R32, a point of (100−x) mass % of R125, and a point of (100−x) mass % of the sum of R1234yf and R134a are within a triangular region surrounded by line segments that connect the following points:

point A [(0.0083x−0.0737)r+0.4x+55.8, (−0.0092x+0.092)r+0.7692x+24.099, 100−a−b−x],
point B [(−0.0071x−0.0783)r−2.8692x+64.651, (0.0114x+0.0442)r−0.4077x+27.112, 100−a−b−x], and
point C [(−0.0132x−0.0512)r+(−1.5615x+61.388), (0.0123x+0.0243)r+(−2.7692x+33.731), 100−a−b−x],
or on the line segments.

Item 2. The composition according to Item 1, wherein the composition is for use as an alternative refrigerant for R404A or R410A.

Item 3. The composition according to Item 1 or 2, further comprising at least one additive selected from the group consisting of tracers, compatibilizing agents, ultraviolet fluorescent dyes, stabilizers, and polymerization inhibitors.

Item 4. The composition according to any one of Items 1 to 3, further comprising a refrigeration oil.

Item 5. The composition according to Item 4, wherein the refrigeration oil contains at least one polymer selected from the group consisting of polyalkylene glycol (PAG), polyol ester (POE), and polyvinyl ether (PVE).

Item 6. A refrigeration method comprising operating a refrigeration cycle using the composition of any one of Items 1 to 5 as a working fluid.

Item 7. A refrigerating machine comprising the composition of any one of Items 1 to 5 as a working fluid.

Item 8. The composition according to any one of Items 1 to 5, which is for use as a working fluid in at least one member selected from the group consisting of a refrigerator, a freezer, a water cooler, an ice maker, a refrigerating showcase, a freezing showcase, a freezing and refrigerating unit, a refrigerating machine for freezing and refrigerating warehouses, a chiller (chilling unit), a turbo refrigerator, and a screw refrigerator.

Item 9. A method for showing a composition ratio of five refrigerant components in a ternary composition diagram (ternary diagram), wherein the total concentration of the five refrigerant components is 100 mass %, and the concentrations of the five components are represented by a mass %, b mass %, c mass %, d mass %, and e mass %, the concentration of one of the refrigerant components is fixed as a mass %, the concentrations of the rest of the four refrigerant components are represented by b mass %, c mass %, and (d+e) mass % to be three components in appearance, and the sum of the concentrations of the three components is shown in the ternary diagram in which the sum of the concentrations of the three components is represented by (100−a) mass %.

Item 10. The method according to Item 10, wherein r=100*[d/(d+e)], which represents a percentage of the concentration d relative to the concentration (d+e), is further introduced, and the concentrations of the three components are shown in the ternary diagram prepared according to the r value.

Advantageous Effects of Invention

The composition according to the present disclosure has a refrigerating capacity equivalent to that of R410A, has a GWP of 1500 or less, and is non-flammable.

DESCRIPTION OF EMBODIMENTS

Definition of Terms

In this specification, the term "refrigerant" includes at least compounds that are specified in ISO817 (International Organization for Standardization) and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly classified into "fluorocarbon-based compounds" and "non-fluorocarbon-based compounds" in terms of the structure of the compounds. "Fluorocarbon-based compounds" include chlorofluorocarbons (CFC), hydrochlorofluorocarbons (HCFC), and hydrofluorocarbons (HFC). "Non-fluorocarbon-based compounds" include propane (R290), propylene (R1270), butane (R600), isobutane (R600a), carbon dioxide (R744), ammonia (R717), and the like.

The term "composition comprising a refrigerant" used in this disclosure at least includes (1) a refrigerant itself (including a refrigerant mixture); (2) a composition that further contains other components and that can be mixed with at least a refrigeration oil to obtain a working fluid for refrigerating machine; and (3) a working fluid for refrigerating machine containing a refrigeration oil. Among these three embodiments, composition (2) is referred to as a "refrigerant composition" in this specification in order to distinguish it from a refrigerant itself (including a mixture of refrigerants). Further, the working fluid for refrigerating machine (3) is referred to as a "refrigeration oil-containing working fluid" in order to distinguish it from the "refrigerant composition."

In the present disclosure, "non-flammable" refrigerants refer to those whose worst case of formulation for flammability (WCF), which is the most flammable composition in the allowable refrigerant concentration range according to the US ANSI/ASHRAE Standard 34-2013, is classified as Class 1.

In the present disclosure, the flammability of refrigerants is determined based on the measuring device and measuring method for the flammability test in accordance with ASTM E681-2009. Specifically, the measurement is performed as follows.

Figure 1:
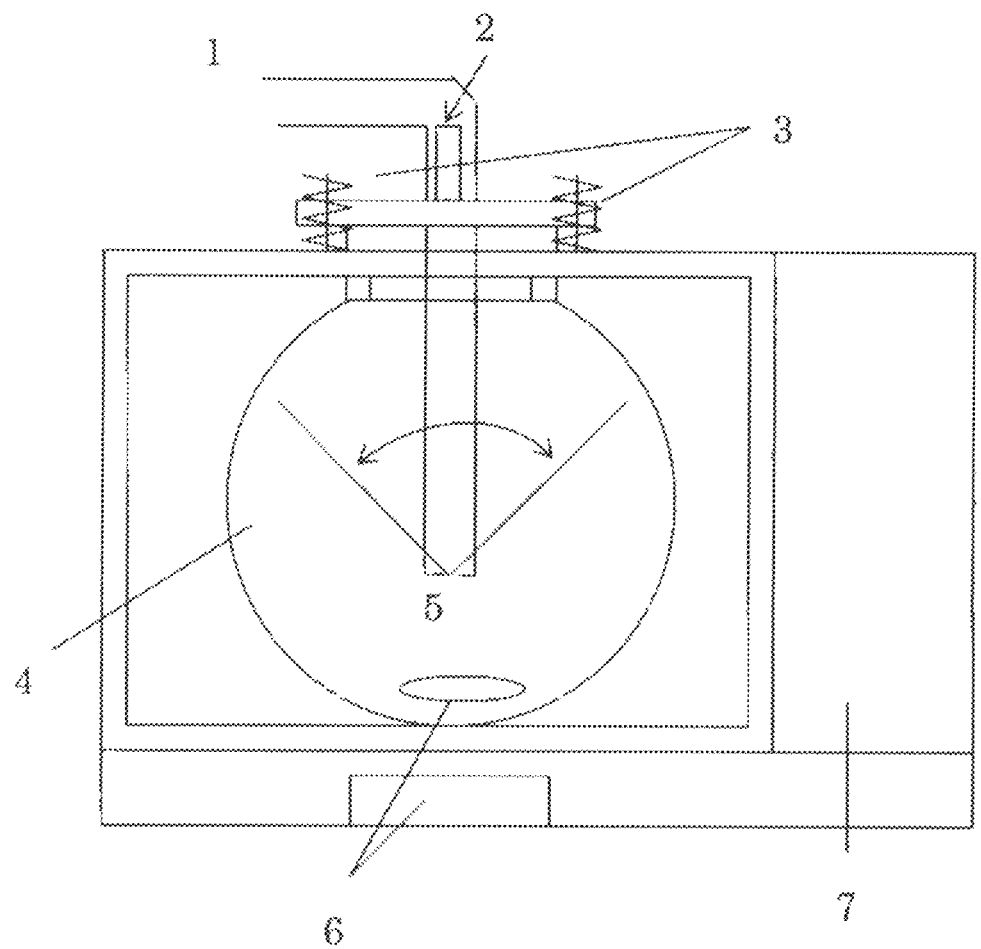
FIG. 1 is a schematic diagram of a device used in a non-flammability test for refrigerants.

A 12-liter spherical glass flask as shown in FIG. 1 is used so that the combustion state can be visually observed and photographically recorded. When excessive pressure is generated by combustion in the glass flask, gas is allowed to escape from the upper lid. Ignition is achieved by electric discharge from electrodes disposed at one-third the distance from the bottom. The test conditions are as follows.

Test Conditions
Test vessel: 280-mm φ spherical (internal volume: 12 liters)
Test temperature: 60° C.±3° C.
Pressure: 101.3 kPa±0.7 kPa
Water: 0.0088 g±0.0005 g per gram of dry air
Mixing ratio of the binary refrigerant composition/air: 1 vol. % increments±0.2 vol. %
Mixture of the binary refrigerant composition: ±0.1 mass %
Ignition method: AC discharge, voltage: 15 kV, electric current: 30 mA, neon transformer
Electrode spacing: 6.4 mm (¼ inch)
Spark: 0.4 seconds±0.05 seconds
Evaluation criteria:
  When the flame spreads at an angle of more than 90° from the ignition point, it is evaluated as flammable (flame propagation).
  When the flame spreads at an angle of 90° or less from the ignition point, it is evaluated as non-flammable (no flame propagation).

In this specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant, by using the second refrigerant. This type of alternative means that the same use is achieved with an alternative refrigerant.

In the present specification, the term "refrigerating machine (refrigerator)" refers to machines in general that draw heat from an object or space to make the temperature thereof lower than the temperature of ambient air, and maintain a low temperature. In other words, refrigerating machines refer to conversion machines that gain energy from the outside to do work and perform energy conversion in order to transfer heat from where the temperature is lower to where the temperature is higher.

The composition according to the present disclosure is a composition containing a mixture of fluorinated hydrocarbons and carbon dioxide, the mixture containing difluoromethane (R32), pentafluoroethane (R125), 2,3,3,3-tetrafluoropropene (R1234yf) and 1,1,1,2-tetrafluoroethane (R134a), wherein the fluorinated hydrocarbons and carbon dioxide ($CO_2$) are present in specific concentrations.

More specifically, in one embodiment, the composition according to the present disclosure is a composition (1) comprising a refrigerant, the refrigerant comprising $CO_2$, R32, R125, R1234yf, and R134a, wherein when the mass % of $CO_2$ based on the sum of $CO_2$, R32, R125, R1234yf, and R134a in the refrigerant is x, the mass % of R1234yf based on the sum of R1234yf and R134a is r, and the mass % of (a) R32, (b) R125, and (c) the sum of R1234yf and R134a, based on the sum of $CO_2$, R32, R125, R1234yf, and R134a, is respectively represented by a, b, and c, the refrigerant satisfies the following requirements:

4.2>x≥2.8;
75≥r≥0; and
coordinates (a, b, c) in a ternary composition diagram whose vertices are a point of (100−x) mass % of R32, a point of (100−x) mass % of R125, and a point of (100−x) mass % of the sum of R1234yf and R134a are within a triangular region surrounded by line segments that connect the following points:
point A [(0.0086x−0.0748)r+0.5x+55.38, (−0.0126x+0.106)r+0.9357x+23.4, 100−a−b−x],
point B [(−0.0077x−0.0756)r−3.0143x+65.26, (0.0126x+0.0392)r+(−0.4x+27.08), 100−a−b−x], and
point C [(−0.0154x−0.042)r−1.4214x+60.8, (0.0171x+0.004)r−2.7857x+33.8, 100−a−b−x], or on the line segments.

In another embodiment, the composition according to the present disclosure is a composition (2) comprising a refrigerant, the refrigerant comprising $CO_2$, R32, R125, R1234yf, and R134a, wherein when the mass % of $CO_2$ based on the sum of $CO_2$, R32, R125, R1234yf, and R134a in the refrigerant is x, the mass % of R1234yf based on the sum of R1234yf and R134a is r, and the mass % of (a) R32, (b) R125, and (c) the sum of R1234yf and R134a, based on the sum of $CO_2$, R32, R125, R1234yf, and R134a, is respectively represented by a, b, and c, the refrigerant satisfies the following requirements:

5.5%≥x≥4.2%;
75≥r≥0; and
coordinates (a, b, c) in a ternary composition diagram whose vertices are a point of (100−x) mass % of R32, a point of (100−x) mass % of R125, and a point of (100−x) mass % of the sum of R1234yf and R134a are within a triangular region surrounded by line segments that connect the following points:
point A [(0.0083x−0.0737)r+0.4x+55.8, (−0.0092x+0.092)r+0.7692x+24.099, 100−a−b−x],
point B [(−0.0071x−0.0783)r−2.8692x+64.651, (0.0114x+0.0442)r−0.4077x+27.112, 100−a−b−x], and
point C [(−0.0132x−0.0512)r+(−1.5615x+61.388), (0.0123x+0.0243)r+(−2.7692x+33.731), 100−a−b−x], or on the line segments.

The composition according to the present disclosure has a GWP of 1500 or less, has a refrigerating capacity equivalent to that of R410A, and is non-flammable.

The composition according to the present disclosure has a GWP of preferably 1500 or less, and more preferably 1475 or less. The composition according to the present disclosure can significantly reduce the burden on the environment from a global warming perspective, compared with other general-purpose refrigerants.

The refrigerating capacity ratio of the composition according to the present disclosure relative to that of R410A is preferably 85% or more, more preferably 90% or more, even more preferably 95% or more, and still even more preferably 100% or more.

The composition according to the present disclosure preferably has a high ratio of refrigerating capacity to power consumed in a refrigeration cycle (coefficient of performance (COP)). Specifically, the COP is preferably 95 or more, and more preferably 100 or more.

The composition according to the present disclosure is non-flammable.

The composition according to the present disclosure can be used as an alternative refrigerant for R410A or R404A. R410A is a refrigerant currently widely used as a refrigerant for freezing. R404A is a refrigerant currently widely used as a refrigerant for freezing and refrigerated storage.

1. Refrigerant

The composition according to the present disclosure is a composition containing a refrigerant (referred to as "the refrigerant according to the present disclosure"), and the refrigerant contains $CO_2$, R32, R125, R1234yf, and R134a in specific concentrations.

There are two types of refrigerants according to the present disclosure, each of which is defined as follows. In the definition, the mass % of $CO_2$ based on the sum of $CO_2$, R32, R125, R1234yf, and R134a is x; the mass % of R1234yf based on the sum of R1234yf and R134a is r; the mass % of (a) R32, (b) R125, and (c) the sum of R1234yf and R134a, based on the sum of $CO_2$, R32, R125, R1234yf, and R134a, is respectively represented by a, b, and c.

The refrigerant according to the first embodiment of the present disclosure (refrigerant (1)) satisfies the following requirements.

4.2>x≥2.8; 75≥r≥0; and coordinates (a, b, c) in a ternary composition diagram whose vertices are a point of (100−x) mass % of R32, a point of (100−x) mass % of R125, and a point of (100−x) mass % of the sum of R1234yf and R134a are within a triangular region surrounded by line segments that connect the following points:

point A [(0.0086x−0.0748)r+0.5x+55.38, (−0.0126x+0.106)r+0.9357x+23.4, 100−a−b−x], point B [(−0.0077x−0.0756)r−3.0143x+65.26, (0.0126x+0.0392)r+(−0.4x+27.08), 100−a−b−x], and point C [(−0.0154x−0.042)r−1.4214x+60.8, (0.0171x+0.004)r−2.7857x+33.8, 100−a−b−x], or on the line segments.

The refrigerant according to the second embodiment of the present disclosure (refrigerant (2)) satisfies the following requirements.

5.5%≥x≥4.2%;

75≥r≥0; and coordinates (a, b, c) in a ternary composition diagram whose vertices are a point of (100−x) mass % of R32, a point of (100−x) mass % of R125, and a point of (100−x) mass % of the sum of R1234yf and R134a are within a triangular region surrounded by line segments that connect the following points:

point A [(0.0083x−0.0737)r+0.4x+55.8, (−0.0092x+0.092)r+0.7692x+24.099, 100−a−b−x], point B [(−0.0071x−0.0783)r−2.8692x+64.651, r(0.0114x+0.0442)−0.4077x+27.112, 100−a−b−x], and point C [(−0.0132x−0.0512)r+(−1.5615x+61.388), (0.0123x+0.0243)r+(−2.7692x+33.731), 100−a−b−x], or on the line segments.

The following shows a case in which the sum of the concentrations of $CO_2$, R32, R125, and (R1234yf and R134a) is 100 mass %, the $CO_2$ concentration is 4.2 mass %, and r=100×1234yf/(R1234yf+R134a)=50, wherein r is a composition ratio of R1234yf to (R1234yf+R134a). By using this case as an example, a method for specifying non-flammability limits in a ternary composition diagram in which the sum of the concentrations of R32, R125, and (R1234yf and R134a) is 95.8 mass % is explained.

To specify non-flammability limits in the ternary composition diagram, it is first necessary to determine the non-flammability limits of a binary mixed refrigerant of a flammable refrigerant (R32, 1234yf) and a non-flammable refrigerant ($CO_2$, R134a, R125). The method for determining the non-flammability limits of a binary mixed refrigerant is shown below.

(1) Non-Flammability Limits of Binary Mixed Refrigerant of Flammable Refrigerant (R32 or 1234yf) and Non-Flammable Refrigerant ($CO_2$, R134a, or R125)) The non-flammability limits of the binary mixed refrigerant were determined based on the measuring apparatus and measuring method for a flammability test according to ASTM E681-2009.

Specifically, a 12-liter spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom. The test conditions are as follows.

Test Conditions

Test vessel: 280 mm φ spherical (internal volume: 12 liters)

Test temperature: 60° C.±3° C.

Pressure: 101.3 kPa±0.7 kPa

Water: 0.0088 g±0.0005 g per gram of dry air

Mixing ratio of binary refrigerant composition/air: 1 vol. % increments±0.2 vol. %

Binary refrigerant composition mixture: ±0.1 wt %

Ignition method: AC discharge, voltage: 15 kV, electric current: 30 mA, neon transformer Electrode spacing: 6.4 mm (¼ inch)

Spark: 0.4 seconds±0.05 seconds

Evaluation criteria:

When the flame spread at an angle of more than 90° from the ignition point, it was evaluated as flammable (flame propagation).

When the flame spread at an angle of 90° or less from the ignition point, it was evaluated as non-flammable (no flame propagation).

The results showed that in a mixed refrigerant of flammable refrigerant R32 and non-flammable refrigerant R134a, no flame propagation was observed at R32=43.0 wt % and R134a=57.0 wt %. This composition was regarded as a non-flammability limit. In a mixed refrigerant of flammable refrigerant R32 and non-flammable refrigerant R125, no flame propagation was observed at R32=63.0 wt % and R125=37.0 wt %. In a mixed refrigerant of flammable refrigerant R32 and non-flammable refrigerant $CO_2$, no flame propagation was observed at R32=40.0 wt % and $CO_2$=60.0 wt %. In a mixed refrigerant of flammable refrigerant 1234yf and non-flammable refrigerant R134a, no flame propagation was observed at 1234yf=62.0 wt % and R134a=38.0 wt %. In a mixed refrigerant of flammable refrigerant 1234yf and non-flammable refrigerant R125, no flame propagation was observed at 1234yf=79.0 wt % and R125=21.0 wt %. In a mixed refrigerant of flammable refrigerant 1234yf and non-flammable refrigerant $CO_2$, no flame propagation was observed at 1234yf=60.0 wt % and $CO_2$=40.0 wt %. These compositions were regarded as non-flammability limits. Table 1 summarizes the results.

TABLE 1

| Item | Flammable refrigerant | Non-flammable refrigerant |
|---|---|---|
| Combination of binary mixed refrigerant | R32 | R134a |
| Non-flammability limit (mass %) | 43.0 | 57.0 |
| Combination of binary mixed refrigerant | R32 | R125 |
| Non-flammability limit (mass %) | 63.0 | 37.0 |
| Combination of binary mixed refrigerant | R32 | $CO_2$ |
| Non-flammability limit (mass %) | 40.0 | 60.0 |
| Combination of binary mixed refrigerant | 1234yf | R134a |
| Non-flammability limit (mass %) | 62.0 | 38.0 |
| Combination of binary mixed refrigerant | 1234yf | R125 |
| Non-flammability limit (mass %) | 79.0 | 21.0 |
| Combination of binary mixed refrigerant | 1234yf | $CO_2$ |
| Non-flammability limit (mass %) | 60.0 | 40.0 |

Subsequently, non-flammability limits when $CO_2$=4.2 mass % and r=50 were determined based on the non-flammability limits of the binary mixed refrigerants determined in [1] by calculation as described below.

1) When $CO_2$=4.2 mass %, r=50, and (R1234yf+R134a)=0 mass %

When R32+R125=95.8 mass %, whether the WCF composition was a non-flammability-limit formulation was investigated in accordance with the following procedure.

(1) Flammable refrigerant concentration in terms of R32=concentration of R32+concentration of R1234yf×(21/79)×(63/37)

(2) Non-flammable refrigerant concentration in terms of R32=concentration of R125×(63/37)+concentration of R134a×(43/57)+concentration of $CO_2$×(40/60)

Here, a composition with (R13234yf+R134a)=0 mass % that achieved the minimum positive value obtained by subtracting the flammable refrigerant concentration in terms of R32 from the non-flammable refrigerant concentration in terms of R32 was defined as the calculated non-flammability-limit formulation.

TABLE 2

| Composition Example | R32 mass % | R125 mass % | R1234yf mass % | R134 mass % | $CO_2$ mass % | Flammable refrigerant concentration in terms of R32 mass % | Non-flammable refrigerant concentration in terms of R32 mass % | Non-flammable refrigerant concentration-flammable refrigerant concentration (Positive value indicates non-flammability) |
|---|---|---|---|---|---|---|---|---|
| Flammability limit | 61.40 | 34.40 | 0.00 | 0.00 | 4.20 | 61.40 | 61.37 | −0.03 |
| Non-flammability limit | 61.30 | 34.50 | 0.00 | 0.00 | 4.20 | 61.30 | 61.54 | 0.24 |

2) When $CO_2$=4.2 mass %, r=50 mass %, and (R1234yf+R134a)=20 mass %

When R32+R125=75.8 mass %, the ASHRAE non-flammability-limit formulation under such conditions was determined in the same procedure as described above. Table 3 shows the results.

TABLE 3

| Composition Example | R32 mass % | R125 mass % | R1234yf mass % | R134 mass % | $CO_2$ mass % | Flammable refrigerant concentration in terms of R32 mass % | Non-flammable refrigerant concentration in terms of R32 mass % | Non-flammable refrigerant concentration-flammable refrigerant concentration (Positive value indicates non-flammability) |
|---|---|---|---|---|---|---|---|---|
| Flammability limit | 50.0 | 25.80 | 10.00 | 10.00 | 4.20 | 54.53 | 54.27 | −0.25 |
| Non-flammability limit | 49.90 | 25.90 | 10.00 | 10.00 | 4.20 | 54.43 | 54.44 | 0.02 |

3) When $CO_2$=4.2 mass %, r=50 mass %, and (R1234yf+R134a)=40 mass %

When R32+R125=75.8 mass %, the ASHRAE non-flammability-limit formulation under such conditions was determined in the same procedure as described above. Table 4 shows the results.

TABLE 4

| Composition Example | R32 mass % | R125 mass % | R1234yf mass % | R134 mass % | $CO_2$ mass % | Flammable refrigerant concentration in terms of R32 mass % | Non-flammable refrigerant concentration in terms of R32 mass % | Non-flammable refrigerant concentration-flammable refrigerant concentration (Positive value indicates non-flammability) mass % |
|---|---|---|---|---|---|---|---|---|
| Flammability limit | 38.50 | 17.30 | 20.00 | 20.00 | 4.20 | 47.55 | 47.34 | −0.21 |
| Non-flammability limit | 38.40 | 17.40 | 20.00 | 20.00 | 4.20 | 47.45 | 47.51 | 0.06 |

4) When $CO_2$=4.2 mass %, r=50 mass %, and (R1234yf+R134a)=60 mass %

When R32+R125=74 mass %, the ASHRAE non-flammability-limit formulation under such conditions was determined in the same procedure as described above. Table 5 shows the results.

TABLE 5

| Composition Example | R32 mass % | R125 mass % | R1234yf mass % | R134 mass % | $CO_2$ mass % | Flammable refrigerant concentration in terms of R32 mass % | Non-flammable refrigerant concentration in terms of R32 mass % | Non-flammable refrigerant concentration-flammable refrigerant concentration (Positive value indicates non-flammability) |
|---|---|---|---|---|---|---|---|---|
| Flammability limit | 27.00 | 8.80 | 30.00 | 30.00 | 4.20 | 40.58 | 40.42 | −0.16 |
| Non-flammability limit | 26.90 | 8.90 | 30.00 | 30.00 | 4.20 | 40.48 | 40.59 | 0.11 |

5) When $CO_2$=4.2 mass %, r=50 mass %, and R125=0 mass %

When R32+R134a+R1234yf=95.8 mass %, the ASHRAE non-flammability-limit formulation under such conditions was determined in the same procedure as described above. Table 6 shows the results.

TABLE 6

| Composition Example | R32 mass % | R125 mass % | R1234yf mass % | R134 mass % | $CO_2$ mass % | Flammable refrigerant concentration in terms of R32 mass % | Non-flammable refrigerant concentration in terms of R32 mass % | Non-flammable refrigerant concentration-flammable refrigerant concentration (Positive value indicates non-flammability) mass % |
|---|---|---|---|---|---|---|---|---|
| Flammability limit | 15.00 | 0.00 | 40.40 | 40.40 | 4.20 | 33.29 | 33.28 | −0.01 |
| Non-flammability limit | 14.80 | 0.00 | 40.50 | 40.50 | 4.20 | 33.13 | 33.35 | 0.22 |

Figure 2:
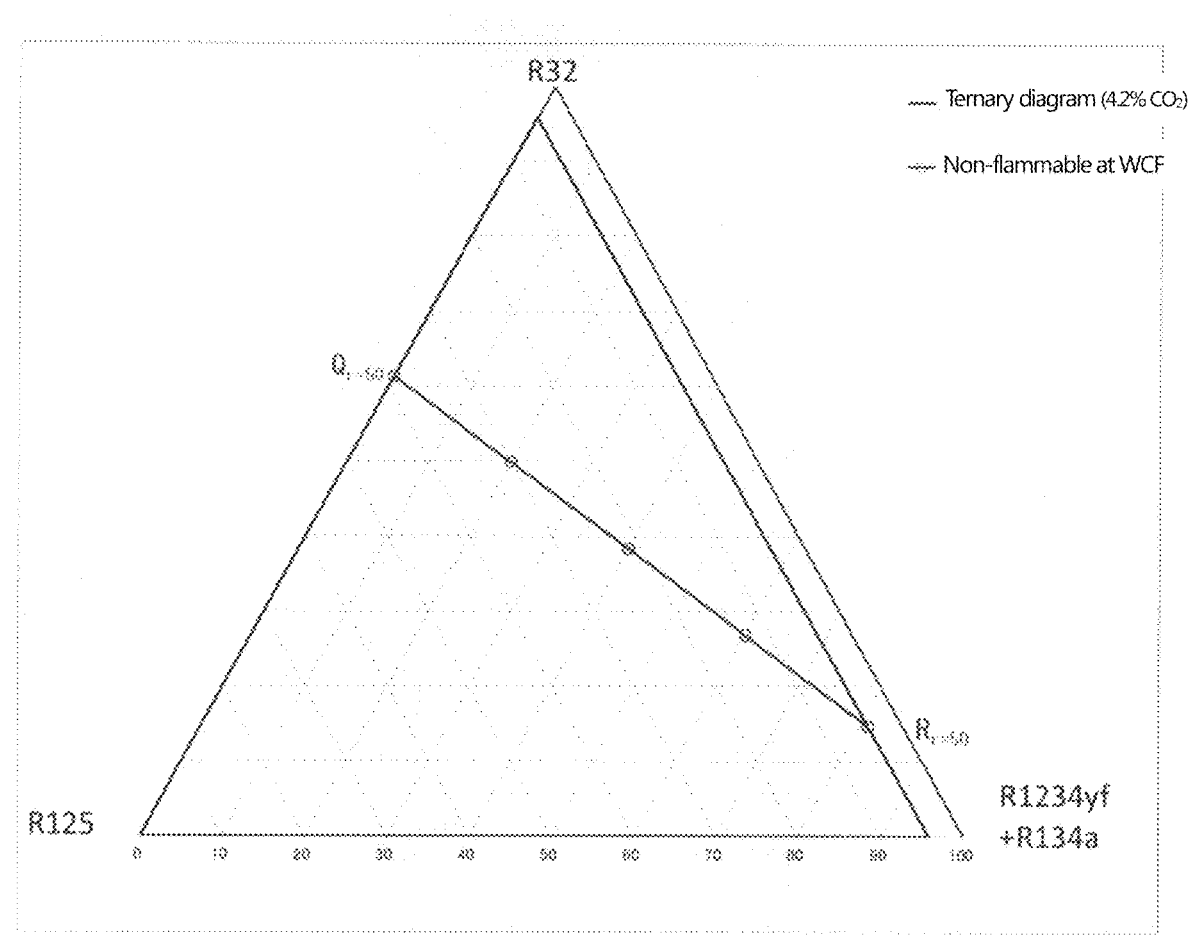
FIG. 2 is a ternary composition diagram at a $CO_2$ concentration of 4.2 mass % in which the sum of R32, R125, and a mixture of R1234yf and 134a is (100−x) mass %, the diagram showing calculated ASHRAE non-flammability limit compositions when the mass % of R1234yf based on the sum of R1234yf and R134a, which is represented by r, is 50 mass %.

FIG. 2 is a ternary composition diagram showing the above results of examining the calculated ASHRAE non-flammability-limit formulations; and the results of connecting the points of the calculated ASHRAE non-flammability-limit formulations are $QR_{r=50}$ in FIG. 2.

[2] Verification of Calculated Non-Flammability Limits Obtained Above in [1] by Flammability Test A flammability test was performed in accordance with ASTM E681 shown in [1] using
composition-1 (R32/R125/1234yf/R134a)=(61.3/34.5/0/0),
composition-3 (R32/R125/1234yf/R134a)=(38.4/17.4/20.0/20.0), and
composition-5 (R32/R125/1234yf/R134a)=(14.8/0/40.5/40.5)
as representative examples of non-flammability limit compositions. The results showed that flame propagation was not observed in these WCFF compositions.

Further, a flammability test was performed in accordance with ASTM E681 shown in [1] using
composition-2 (R32/R125/1234yf/R134a)=(50.0/25.8/10.0/10.0) and
composition-4 (R32/R125/1234yf/R134a)=(27.0/8.8/30.0/30.0) as representative examples of flammability limit compositions. The results showed that flame propagation was observed in these WCFF compositions.

Thus, the non-flammability limits determined by calculation in [1] based on the non-flammability limits of the binary compositions determined in [1] satisfy the requirements of WCF non-flammability in ASHRAE based on ASHRAE ANSI/ASHRAE Standard 34-2013.

The method of determining WCF non-flammability limits when $CO_2$=4.2 mass % and r=50 is shown above. The WCF non-flammability limit line is found to be on a straight line connecting point $Q_{r=50}$ with (R1234yf+R134a)=0 and point $Q_{r=50}$ with R125=0. The WCF non-flammability limits shown in FIGS. 3 to 9 were also determined by drawing a straight line by determining two points, i.e., point $Q_r$ with (R1234yf+R134a)=0 and point Rr with R125=0. In FIGS. 3 to 9, WCF compositions are non-flammable on the R125 side. FIGS. 3 to 9 show composition ratios in which the GWP is 1500 or less on the R32 side from the line segment OrPr; WCF compositions are non-flammable on the R125 side from the line segment QrRr; and the refrigeration capacity relative to 410A is 100% or more on the R32 side from the line segment BrCr.

The composition ratio of $CO_2$, R32, R125, 1234yf, and R134a contained in the mixture is such that when the concentration of $O_2$ is x mass %, the sum of the concentrations of R32, R125, (R1234yf+R134a) is (100−x) mass %; and the composition ratio of $CO_2$, R32, R125, and (1234yf+R134a) contained in the mixture can be expressed as a coordinate point in a ternary composition diagram in which the sum of the concentrations of R32, R125, and (1234yf+R134a) is (100−x). By newly introducing r=100×R1234yf/(R1234yf+R134a), which is a composition ratio of R1234yf to (R1234yf+R134a), and allocating the r value to the range of 0 to 100 in a ternary composition diagram of R32, R125, and (R1234yf+R134a), any mixing range of R32, R125, R1234yf, and R134a can be expressed as a point in the ternary composition diagram of R32, R125, and (R1234yf+R134a). A specific method for obtaining the coordinate point is shown below.

In the following description, cases are classified according to the range of x and the range of r. The meaning of points 0, P, Q, R, A, B, and C is as described follows. The concentrations of the points were determined in the Examples, described later, and the determined values are shown.

O: a composition ratio when GWP is 1500 and the concentration of (R1234yf+R134a) (mass %) is 0 mass %.
P: a composition ratio when GWP is 1500 and the concentration of R32 (mass %) is 0 mass %.
Q: a composition ratio when the WCF composition is non-flammable and the concentration of (R1234yf+R134a) (mass %) is 0 mass %.
R: a composition ratio when the WCF composition is non-flammable, and the concentration of R32 (mass %) is 0 mass % or the concentration of R125 (mass %) is 0 mass %.
A: a composition ratio at the intersection of line segment OP and line segment QR.
B: a composition ratio when the GWP is 1500 and the refrigerating capacity is 100% relative to that of R410A.
C: a composition ratio when the WCF composition is non-flammable, and the refrigerating capacity is 100% relative to that of R410A.
$A_{r=50}$: point A when r=50=100×concentration (%) of R1234yf/(concentration (%) of R1234yf+concentration (%) of R134a)
$A_{r=0\ to\ Y}$: point A indicated by the function or r when r is in the range of 0 to Y.

FIGS. 3 to 9 show composition ratios in which GWP is 1500 or less on the R32 side from the line segment OrPr; WCF compositions are non-flammable on the R125 side from the line segment QrRr; and the refrigerating capacity is 100% or more relative to that of 410A on the R32 side from the line segment BrCr.

How to Determine Points $A_r$, $B_r$, and $C_r$
1) How to determine $A_{r=0\ to\ 75}$ when 4.2 mass %≥x≥2.8 mass % and 75≥r≥0

Figure 3:
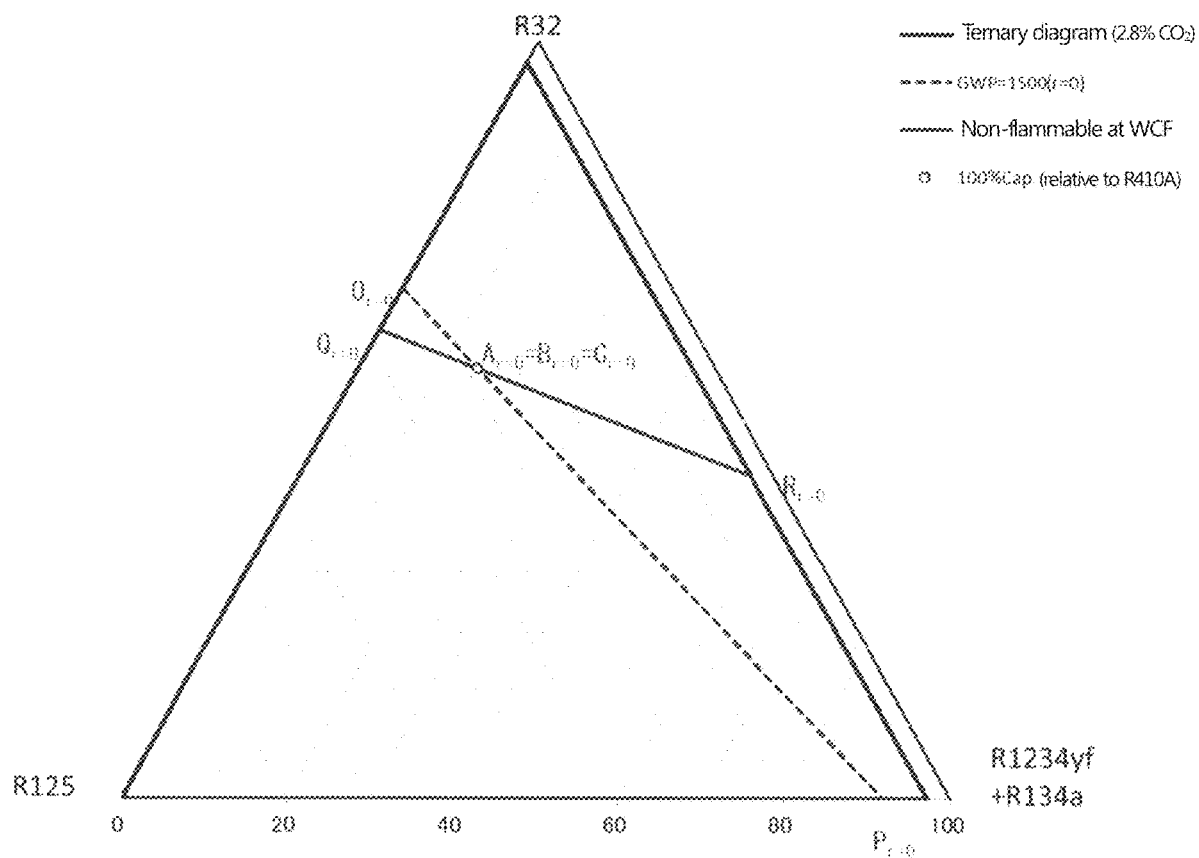
FIG. 3 is a ternary composition diagram at a $CO_2$ concentration of 2.8 mass % in which the sum of the concentrations of R32, R125, and a mixture of R1234yf and 134a is (100−x) mass %, the diagram showing points $O_{r=0}$, $P_{r=0}$, $Q_{r=0}$, $R_{r=0}$, $A_{r=0}$, $B_{r=0}$, and $C_{r=0}$, which are points when r is 0 in the ternary composition diagram.

FIG. 3 shows points $O_{r=0}$, $P_{r=0}$, $Q_{r=0}$, $R_{r=0}$, $A_{r=0}$, $B_{r=0}$, and $C_{r=0}$ in a ternary composition diagram at a $CO_2$ concentration of 2.8 mass % in which the sum of the concentrations of R32, R125 and (R1234yf+134a) is (100−x) mass % and the relationship between the concentration of R1234yf and the concentration of (R1234yf+R134a) is expressed as r=100×R1234yf/(R1234yf+R134a) and r=0. The concentrations of points $O_{r=0}$, $P_{r=0}$, $Q_{r=0}$, $R_{r=0}$, $A_{r=0}$, $B_{r=0}$, and $C_{r=0}$ are shown in the Examples.

In this case, when the concentration of R32 is w mass % and the concentration of R125 is z mass %, the line segment $O_{r=0}P_{r=0}$ is represented by w=−0.3635z+5.3, and the line segment $Q_{r=0}R_{r=0}$ is represented by w=1.8482z−79.102. Accordingly, the intersection of these lines, $A_{r=0}$, is (concentration of R32 (mass %)/concentration of R125 (mass %)/concentration of (R1234yf+134a) (mass %))=(56.8/26.0/14.4).

Figure 4:
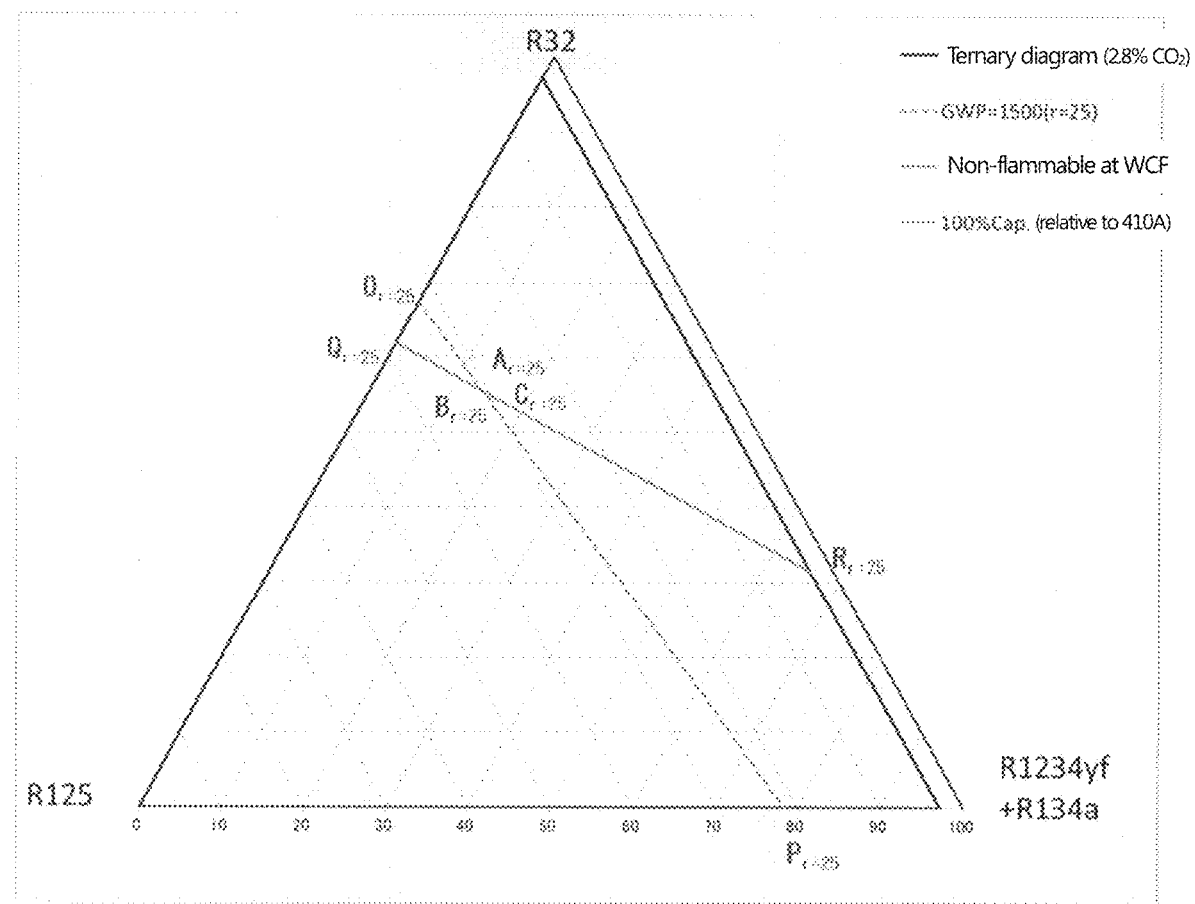
FIG. 4 is a ternary composition diagram at a $CO_2$ concentration of 2.8 mass % in which the sum of the concentrations of R32, R125, and a mixture of R1234yf and 134a is (100−x) mass %, the diagram showing points $O_{r=25}$, $P_{r=25}$, $Q_{r=25}$, $R_{r=25}$, $A_{r=25}$, $B_{r=25}$, and $C_{r=25}$, which are points when r is 25 in the ternary composition diagram.
Figure 5:
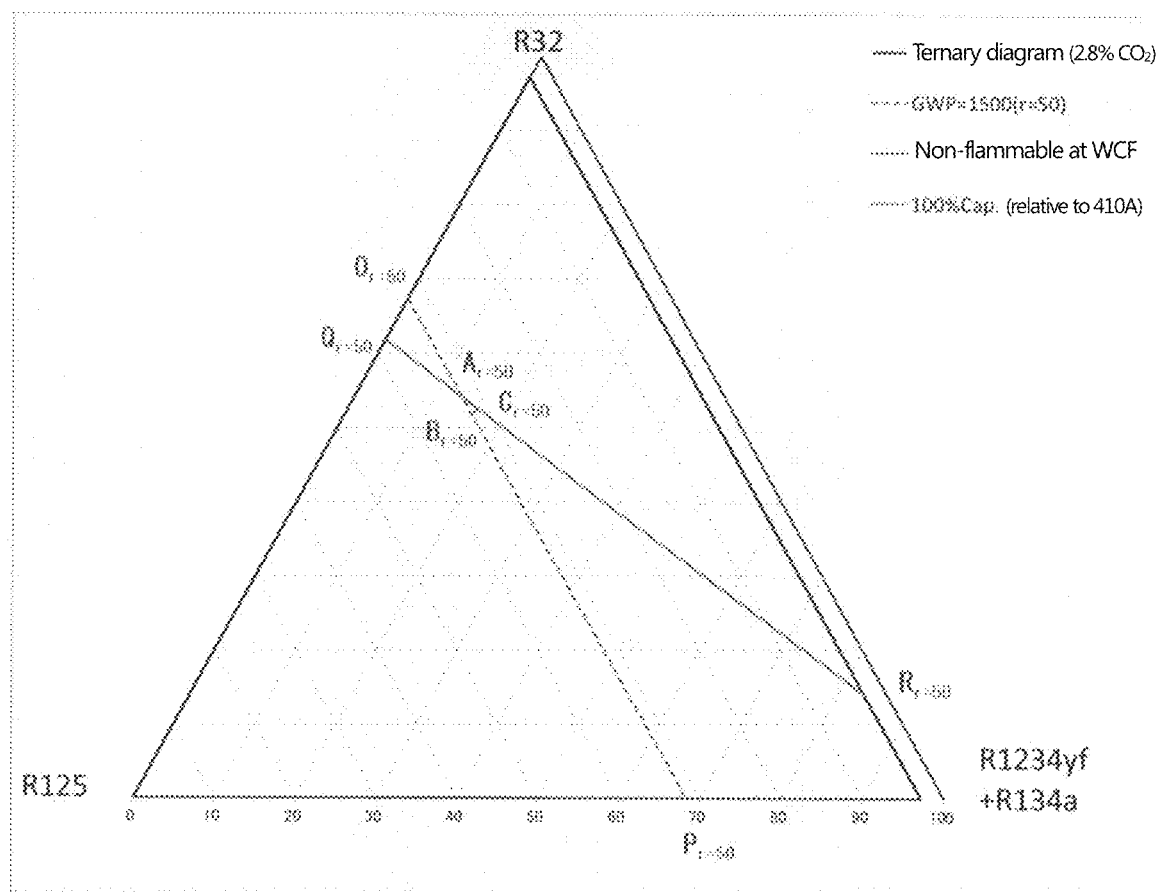
FIG. 5 is a ternary composition diagram at a $CO_2$ concentration of 2.8 mass % in which the sum of the concentrations of R32, R125, and the mixture of R1234yf and 134a is (100−x) mass %, the diagram showing points $O_{r=50}$, $P_{r=50}$, $Q_{r=50}$, $R_{r=50}$, $A_{r=50}$, $B_{r=50}$, and $C_{r=50}$, which are points when r is 50 in the ternary composition diagram.
Figure 6:
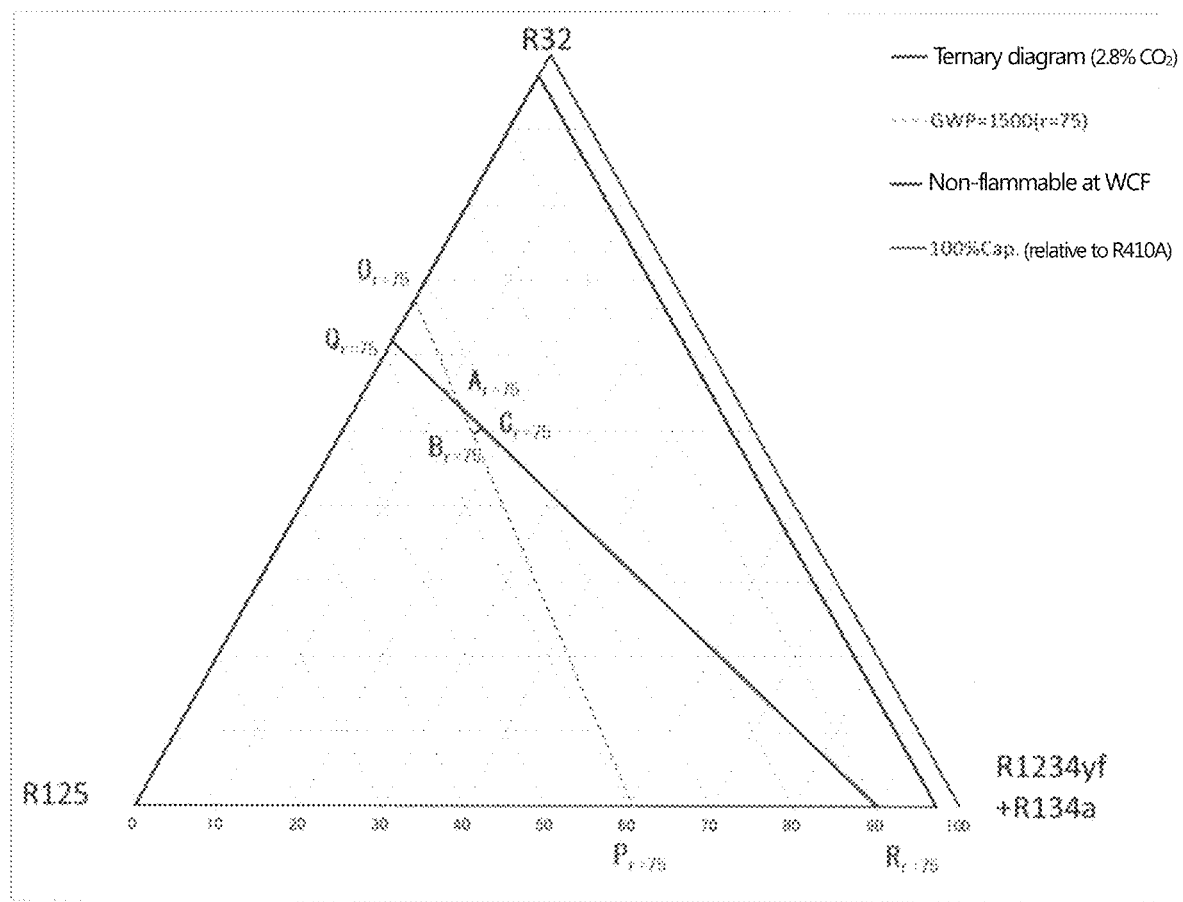
FIG. 6 is a ternary composition diagram at a $CO_2$ concentration of 2.8 mass % in which the sum of the concentrations of R32, R125, and a mixture of R1234yf and 134a is (100−x) mass %, the diagram showing points $O_{r=75}$, $P_{r=75}$, $Q_{r=75}$, $R_{r=75}$, $A_{r=75}$, $B_{r=75}$, and $C_{r=75}$, which are points when r is 75 in the ternary composition diagram.

In the following, FIG. 4 shows points $O_{r=20}$, $P_{r=20}$, $Q_{r=20}$, $R_{r=20}$, $A_{r=20}$, $B_{r=20}$, and $C_{r=20}$ when r=25. FIG. 5 shows those points when r=50. FIG. 6 shows those points when r=75. The intersection A of line segments OP and QR is determined below in the same manner. The results show that $A_{r=25}$=(55.5/27.8/13.9), $A_{r=50}$=(54.2/29.6/13.4), and $A^{r=75}$= (53.0/31.3/12.9). When a straight line or a curve connecting point $A_{r=0}$ to point $A_{r=75}$ is determined for r by the least squares method, the concentration % of R32 is approximated by (−0.0508r+56.78) mass %, and the concentration % of R125 is approximated by (0.0708r+26.02) mass %. In this case, the concentration % of (R1234yf+R134a) is represented by (100−R32−R125−x) mass %; the concentration % of R1234yf is represented by ((R1234yf+R134a)×r/100) mass %, and the concentration % of R134a is represented by 100−R32−R125−R1234yf−x.

Figure 7:
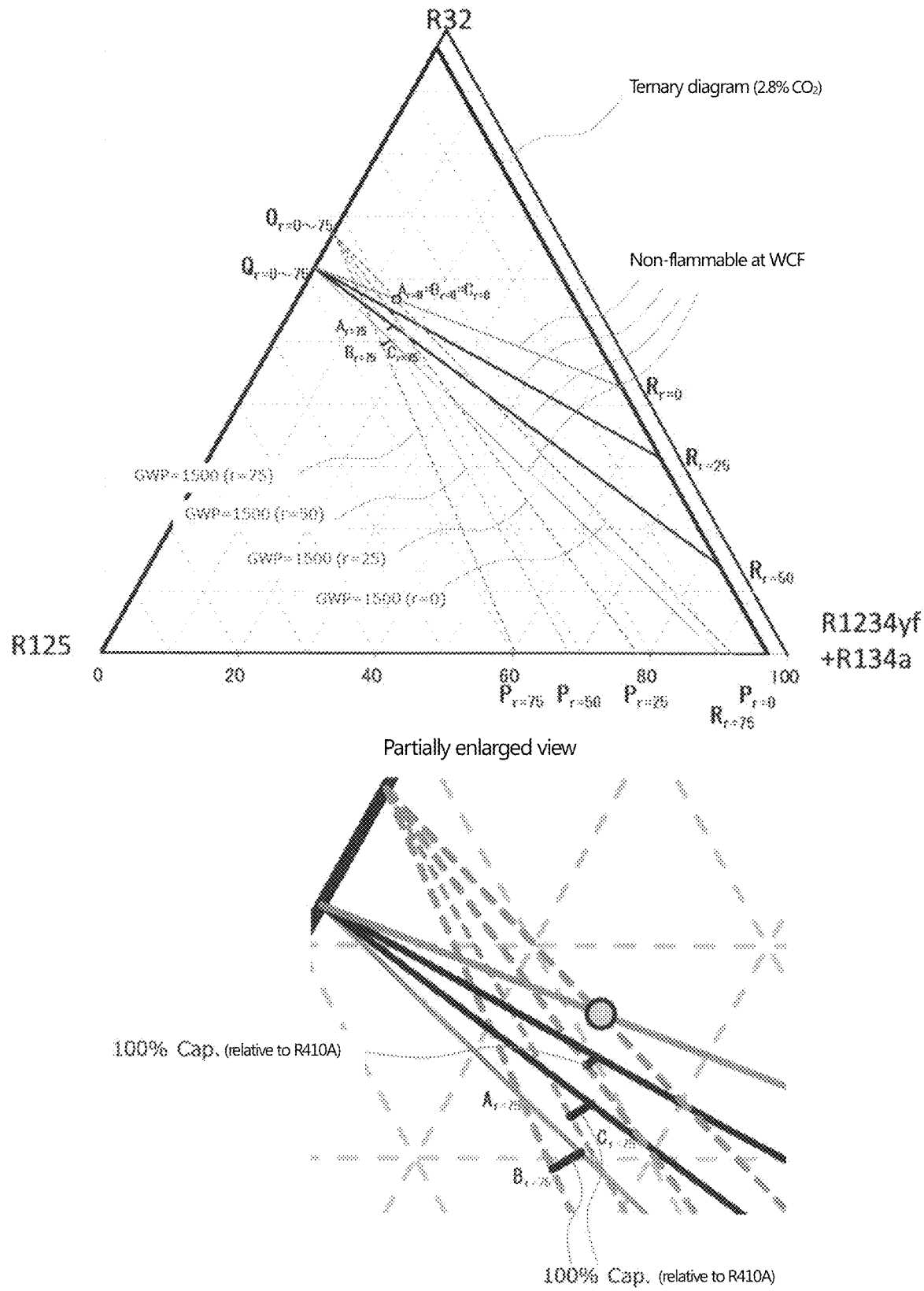
FIG. 7 is a ternary composition diagram at a $CO_2$ concentration of 2.8 mass % in which the sum of the concentrations of R32, R125, and a mixture of R1234yf and 134a is (100−x) mass %, the diagram showing points O, P, Q, R, A, B, and C, which are points when r is 0, 25, 50, or 75 in the ternary composition diagram.

FIG. 7 shows points 0, P, Q, R, A, B, and C when x=$CO_2$ concentration %=2.8 mass % and r=0, 25, 50, 75. By newly introducing r in this way and allocating r to the range of 0 to 100, all of the R32 concentration, R125 concentration, R1234yf concentration, and R134a concentration when x=$CO_2$=2.8 mass % can be shown in a ternary composition diagram of R32, R125 and (R1234yf+R134a), the sum of which is indicated by (100−x). The intersection $A_{r=0\ to\ 75}$ of line segment $O_{r=0\ to\ 75}P_{r=0\ to\ 75}$ and line segment $Q_{r=0\ to\ 75}R_{r=0\ to\ 75}$, wherein r is in the range of 0 to 75, can be approximated as a function of r by (concentration of R32 (mass %)/concentration of R125 (mass %))/concentration of (R1234yf+134a) (mass %))=(−0.0508r+56.78/0.0708r+ 26.02/100−R32−R125−x).

Figure 8:
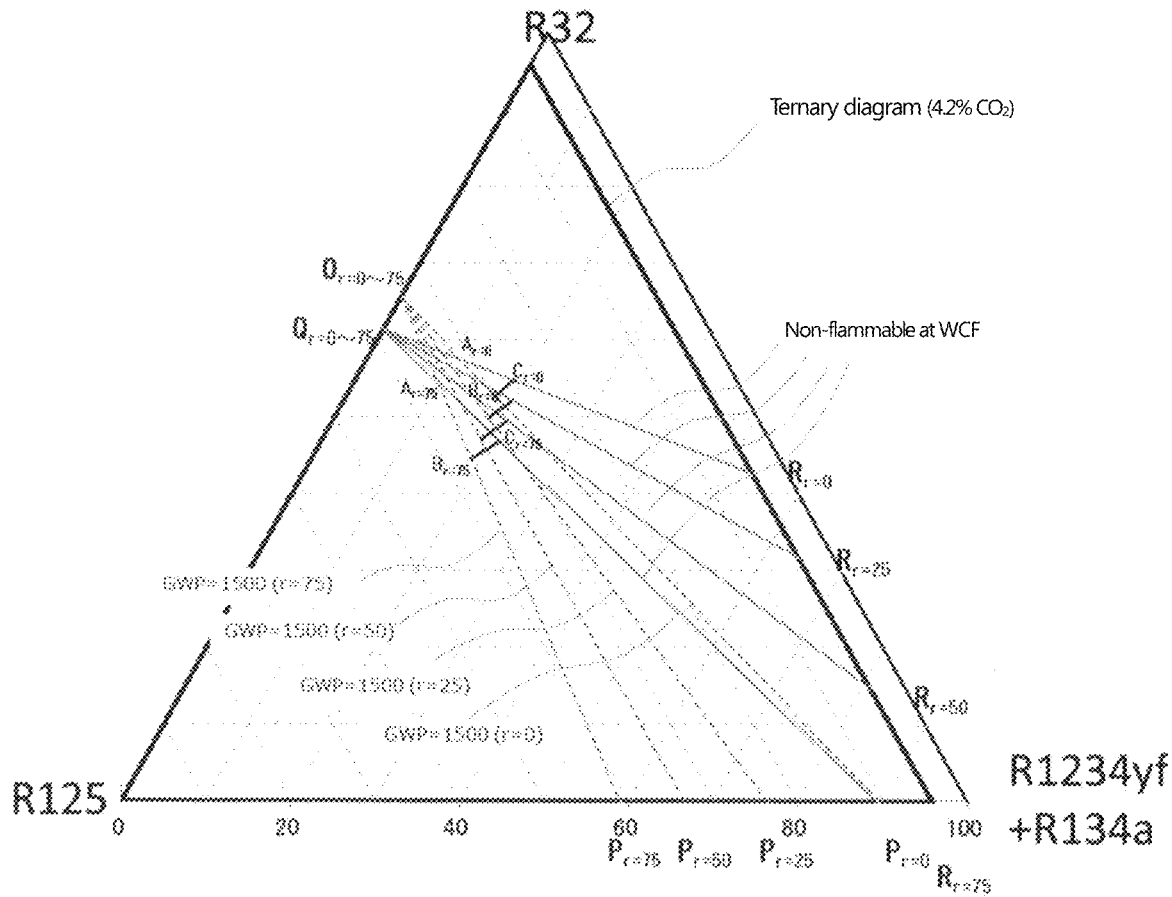
FIG. 8 is a ternary composition diagram at a $CO_2$ concentration of 4.2 mass % in which the sum of the concentrations of R32, R125, and a mixture of R1234yf and 134a is (100−x) mass %, the diagram showing points $O_{r=0\ to\ 75}$, $P_{r=0\ to\ 75}$, $Q_{r=0\ to\ 75}$, $R_{r=0\ to\ 75}$, $A_{r=0\ to\ 75}$, $B_{r=0\ to\ 75}$, and $C_{r=0\ to\ 75}$, which are points when r is 0, 25, 50, or 75 in the ternary composition diagram.
Figure 8:
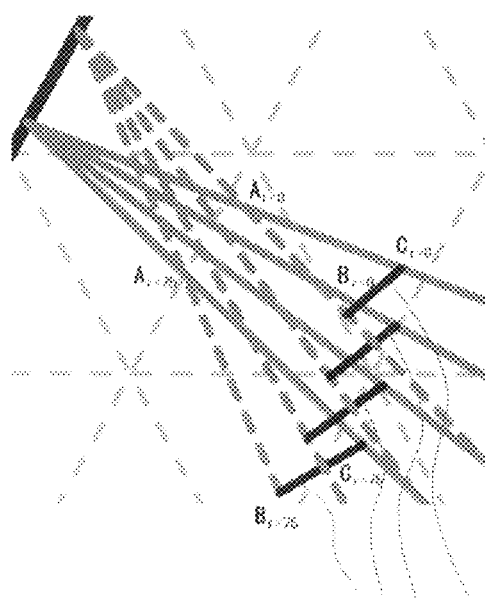
Figure 9:
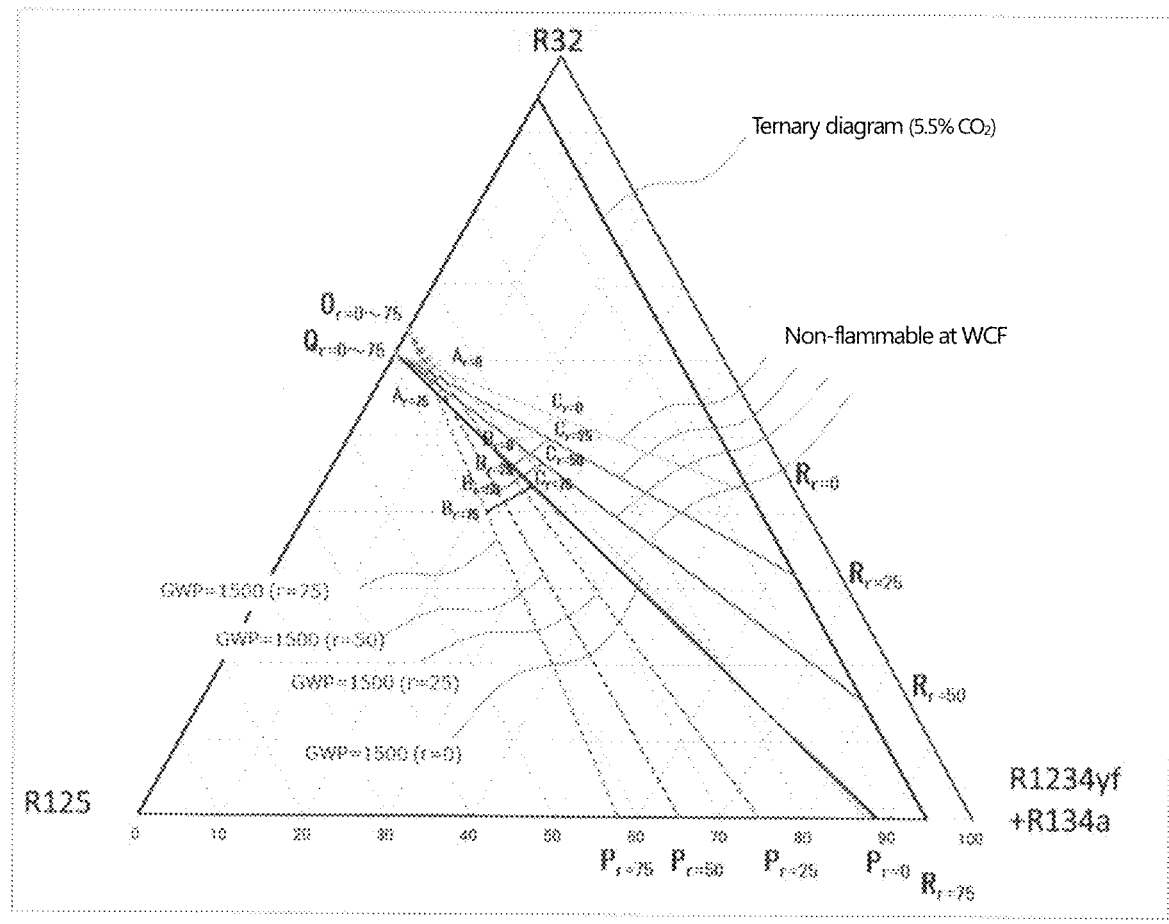
FIG. 9 is a ternary composition diagram at a $CO_2$ concentration of 5.5 mass % in which the sum of the concentrations of R32, R125, and a mixture of R1234yf and 134a is (100−x) mass %, the diagram showing points $O_{r=0\ to\ 75}$, $P_{r=0\ to\ 75}$, $Q_{r=0\ to\ 75}$, $R_{r=0\ to\ 75}$, $A_{r=0\ to\ 75}$, $B_{r=0\ to\ 75}$, and $C_{r=0\ to\ 75}$, which are points when r is 0, 25, 50, or 75 in the ternary composition diagram.
Figure 9:
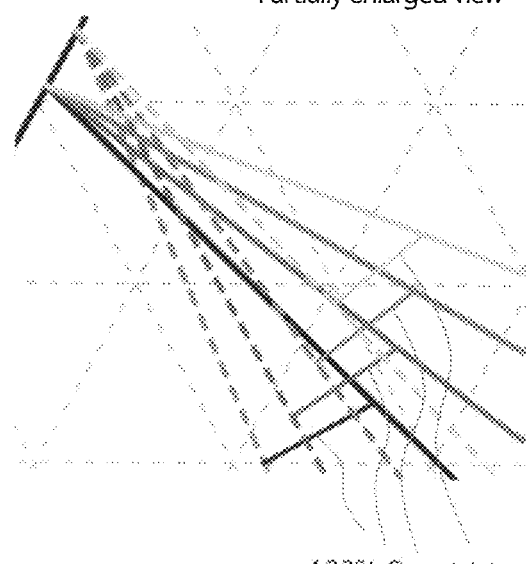

FIG. 8 shows points $O_r$, $P_r$, $Q_r$, $R_r$, $A_r$, $B_r$, and $C_r$ in a ternary composition diagram at a $CO_2$ concentration of 4.2 mass % in which the sum of the concentrations of R32, R125 and (R1234yf+134a) is (100−x) mass % and the relationship between the concentration of R1234yf and the concentration of (R1234yf+R134a) is expressed as r=100×R1234yf/(R1234yf+R134a) and r=0, 25, 50, or 75. Table 1 shows (concentration of R32 (mass %)/concentration of R125 (mass %)/concentration of (R1234yf+134a) (mass %)) at $A_{r=0}$, $A_{r=25}$, $A_{r=50}$, and $A_{r=75}$ obtained in the same manner as above. The intersection $A_{r=0\ to\ 75}$ of line segments $O_{r=0\ to\ 75}P_{r=0\ to\ 75}$ and $Q_{r=0\ to\ 75}R_{r=0\ to\ 75}$ can be approximated as a function of r by (concentration of R32 (mass %)/concentration R125 (mass %)/concentration of (R1234yf+134a) (mass %))=(−0.0388r+57.481/0.0532r+ 27.33/100−R32−R125−x) in the same manner as above.

Accordingly, when x=2.8 mass %, the concentration of R32 (mass %)=−0.0508r+56.789. When x=4.2 mass %, the concentration of R32=−0.0388r+57.481. Therefore, when 4.2 mass %≥x≥2.8 mass %, the concentration of R32 can be approximated by R32 mass %=(ax+b)r+(a'x+b'). From 2.8a+ b=−0.0508 and 4.2a+b=−0.0388, a=0.0086 and b=−0.00748. From 2.8a'+b'=56.78 and 4.2a'+b'=57.48, a'=0.5 and b'=55.38. Accordingly, when 4.2 mass %≥x≥2.8 mass %, the concentration of R32 is approximated by R32 mass %=(0.0086x−0.0748)r+(0.5x+55.38). Further, when x=2.8 mass %, the concentration (%) of R125=0.0708r+26.02. When x=4.2 mass %, the concentration of R125=0.0532r+27.33. Therefore, when 4.2 mass %≥x≥2.8 mass %, the concentration of R125 can be approximated by the mass % of R125=(ax+b)r2+(a'x+b')r+(a''x+b''). Accordingly, 2.8a+b=0.0708, 4.2a+b=0.0532, 2.8a'+b'=26.02, 4.2a'+b'=27.33, a=−0.0126, b=0.106, a'=0.9357, and b'=23.4. Thus, when 4.2 mass %≥x≥2.8 mass %, the concentration of R125 can be approximated by the mass % of R125=(−0.0126x+0.106)r+(0.9357x+23.4). Accordingly, when 4.2 mass %≥x≥2.8 mass %, point $A_{r=0\ to\ 75}$ can be approximated by (concentration of R32 (mass %)/concentration of R125 (mass %)/concentration of (R1234yf+134a) (mass %))= ((0.0086x−0.0748)r+(0.5x+55.37)/(−0.0126x+0.106)r+(0.9357x+23.4)/100−R32−R125−x). In this case, the concentration % of R1234yf=(100−R32−R125−x)*r/100, and the concentration of R134a=100−R32−R125−R1234yf−x.

Table 7 summarizes how to determine $A_{r=0\ to\ 60}$ (concentration (mass %) of R32/concentration (mass %) of R125/concentration (mass %) of (R1234yf+134a)) when 4.2 mass %≥x≥2.8 mass % and 60≥r≥0, as shown above.

$A_{r=0\ to\ 75}$ when 4.2 mass %≥x≥2.8 mass % and 75≥r≥0

TABLE 7

| | | r = 100 * R1234yf/(R1234yf + R134a) | | | | r = 100 * R1234yf/(R1234yf + R134a) | | | |
|---|---|---|---|---|---|---|---|---|---|
| Item | | 0 | 25 | 50 | 75 | 0 | 25 | 50 | 75 |
| Point A | R32 | 56.8 | 55.5 | 54.2 | 53 | 57.5 | 56.5 | 55.5 | 54.6 |
| | R125 | 26 | 27.8 | 29.6 | 31.3 | 27.3 | 28.7 | 30 | 31.3 |
| | R1234yf + R134a | 14.4 | 13.9 | 13.4 | 12.9 | 11 | 10.6 | 10.3 | 9.9 |
| | CO$_2$ | 2.8 | 2.8 | 2.8 | 2.8 | 4.2 | 4.2 | 4.2 | 4.2 |
| Approximate formula | R32 | −0.0508r + 56.78 | | | | −0.0388r + 57.48 | | | |
| | R125 | 0.0708r + 26.02 | | | | 0.0532r + 27.33 | | | |
| | R1234yf | (100 − R32 − R125 − CO$_2$) * r/100 | | | | (100 − R32 − R125 − CO$_2$) * r/100 | | | |
| | R134a | 100 − R32 − R125 − R1234yf − CO$_2$ | | | | 100 − R32 − R125 − R1234yf − CO$_2$ | | | |
| Approximate formula of R32 represented by using r and x. | CO$_2$ | 2.8 | | | | 4.2 | | | |
| | a | −0.0508 | | | | −0.0388 | | | |
| | B | 56.7800 | | | | 57.4800 | | | |
| | Approximate formula a | 0.0086x − 0.0748 | | | | | | | |
| | Approximate formula b | 0.5x + 55.38 | | | | | | | |
| | Approximate formula of R32 | R32 = (0.0086x − 0.0748)r + (0.5x + 55.38) | | | | | | | |
| Approximate formula of R125 represented by using r and x | CO$_2$ | 2.8 | | | | 4.2 | | | |
| | a | 0.0708 | | | | 0.0532 | | | |
| | b | 26.0200 | | | | 27.3300 | | | |
| | Approximate formula a | −0.0126x + 0.106 | | | | | | | |
| | Approximate formula b | 0.9357x + 23.4 | | | | | | | |
| | Approximate formula of R125 | R125 = (−0.0126x + 0.106)r + (0.9357x + 23.4) | | | | | | | |

2) $B_{r=0\ to\ 75}$ and $C_{r=0\ to\ 75}$ when 4.2 mass %≥x≥2.8 mass % and 75≥r≥40

$B_{r=0\ to\ 60}$ and $C_{r=0\ to\ 60}$ were obtained in the same manner as above for $A_{r=0}$. Table 2 below shows $B_{r=0\ to\ 60}$ and Table 8 shows $C_{r=0\ to\ 60}$ below.

$B_{r=0\ to\ 75}$ when 4.2 mass %≥x≥2.8 mass % and 75≥r≥ 0

TABLE 8

| | | r = 100 * R1234yf/(R1234yf + R134a) | | | | r = 100 * R1234yf/(R1234yf + R134a) | | | |
|---|---|---|---|---|---|---|---|---|---|
| Item | | 0 | 25 | 50 | 75 | 0 | 25 | 50 | 75 |
| Point B | R32 | 56.8 | 54.4 | 52 | 49.5 | 52.6 | 49.9 | 47.2 | 44.5 |
| | R125 | 26 | 27.8 | 29.7 | 31.6 | 25.4 | 27.7 | 30 | 32.3 |
| | R1234yf + R134a | 14.4 | 15 | 15.5 | 16.1 | 17.8 | 18.2 | 18.6 | 19 |
| | CO$_2$ | 2.8 | 2.8 | 2.8 | 2.8 | 4.2 | 4.2 | 4.2 | 4.2 |
| Approximate formula | R32 | −0.0972r + 56.82 | | | | −0.108r + 52.6 | | | |
| | R125 | 0.0748r + 25.97 | | | | 0.092r + 25.4 | | | |
| | R1234yf | (100 − R32 − R125 − CO$_2$) * r/100 | | | | (100 − R32 − R125 − CO$_2$) * r/100 | | | |
| | R134a | 100 − R32 − R125 − R1234yf − CO$_2$ | | | | 100 − R32 − R125 − R1234yf − CO$_2$ | | | |
| Approximate formula of R32 represented by using r and x | CO$_2$ | 2.8 | | | | 4.2 | | | |
| | a | −0.0972 | | | | −0.1080 | | | |
| | b | 56.8200 | | | | 52.6000 | | | |
| | Approximate formula a | −0.0077x − 0.0756 | | | | | | | |
| | Approximate formula b | −3.0143x + 65.26 | | | | | | | |
| | Approximate | R32 = (−0.0077x − 0.0756)r + (−3.0143x + 65.26) | | | | | | | |

TABLE 8-continued

|  |  | \multicolumn{4}{c}{r = 100 * R1234yf/(R1234yf + R134a)} | \multicolumn{4}{c}{r = 100 * R1234yf/(R1234yf + R134a)} |
| --- | --- | --- | --- | --- | --- | --- | --- | --- | --- |
| Item |  | 0 | 25 | 50 | 75 | 0 | 25 | 50 | 75 |
| R125 approximate formula represented by using r and x | formula of R32 |  |  |  |  |  |  |  |  |
|  | $CO_2$ | | | 2.8 | | | | 4.2 | |
|  | a | | | 0.0748 | | | | 0.0920 | |
|  | b | | | 25.9700 | | | | 25.4000 | |
|  | Approximate formula a | \multicolumn{8}{c}{$0.0123x + 0.0404$} |
|  | Approximate formula b | \multicolumn{8}{c}{$-0.4071x + 27.11$} |
|  | Approximate formula of R125 | \multicolumn{8}{c}{R125 = (0.0123x + 0.0404)r + (−0.4071x + 27.11)} |

$C_{r=0 \text{ to } 75}$ when 4.2 mass % ≥ x ≥ 2.8 mass % and 75 ≥ r ≥ 0

TABLE 9

|  |  | \multicolumn{4}{c}{r = 100 * R1234yf/(R1234yf + R134a)} | \multicolumn{4}{c}{r = 100 * R1234yf/(R1234yf + R134a)} |
| --- | --- | --- | --- | --- | --- | --- | --- | --- | --- |
| Item |  | 0 | 25 | 50 | 75 | 0 | 25 | 50 | 75 |
| Point C | R32 | 56.8 | 54.7 | 52.6 | 50.4 | 54.8 | 52.2 | 49.5 | 46.8 |
|  | R125 | 26 | 27.3 | 28.6 | 29.9 | 22.1 | 24 | 25.9 | 27.8 |
|  | R1234yf + R134a | 14.4 | 15.2 | 16 | 16.9 | 18.9 | 19.6 | 20.4 | 21.2 |
|  | $CO_2$ | 2.8 | 2.8 | 2.8 | 2.8 | 4.2 | 4.2 | 4.2 | 4.2 |
| Approximate formula | R32 | \multicolumn{4}{c}{$-0.0852r + 56.82$} | \multicolumn{4}{c}{$-0.1068r + 54.83$} |
|  | R125 | \multicolumn{4}{c}{$0.052r + 26$} | \multicolumn{4}{c}{$0.076r + 22.1$} |
|  | R1234yf | \multicolumn{4}{c}{$(100 - R32 - R125 - CO_2) * r/100$} | \multicolumn{4}{c}{$(100 - R32 - R125 - CO_2) * r/100$} |
|  | R134a | \multicolumn{4}{c}{$100 - R32 - R125 - R1234yf - CO_2$} | \multicolumn{4}{c}{$100 - R32 - R125 - R1234yf - CO_2$} |
| Approximate formula of R32 represented by using r and x | $CO_2$ | | | 2.8 | | | | 4.2 | |
|  | a | | | −0.0852 | | | | −0.1068 | |
|  | b | | | 56.8200 | | | | 54.8300 | |
|  | Approximate formula a | \multicolumn{8}{c}{$-0.0154x - 0.042$} |
|  | Approximate formula b | \multicolumn{8}{c}{$-1.4214x + 60.8$} |
|  | Approximate formula of R32 | \multicolumn{8}{c}{R32 = (−0.0154x − 0.042)r + (−1.4214x + 60.8)} |
| Approximate formula of R125 represented by using r and x | $CO_2$ | | | 2.8 | | | | 4.2 | |
|  | a | | | 0.0520 | | | | 0.0760 | |
|  | b | | | 26.0000 | | | | 22.1000 | |
|  | Approximate formula a | \multicolumn{8}{c}{$0.0171x + 0.004$} |
|  | Approximate formula b | \multicolumn{8}{c}{$-2.7857x + 33.8$} |
|  | Approximate formula of R125 | \multicolumn{8}{c}{R125 = (0.0171x + 0.004)r + (−2.7857x + 33.8)} |

(3) $A_{r=0 \text{ to } 75}$, $B_{r=0 \text{ to } 75}$, and $C_{r=0 \text{ to } 75}$ when 5.5 mass % ≥ x ≥ 4.2 mass % and 75 ≥ r ≥ 0

$A_{r=0 \text{ to } 75}$ when 5.5 mass % ≥ x ≥ 4.2 mass % and 75 ≥ r ≥ 0

TABLE 10

|  |  | \multicolumn{4}{c}{r = 100 * R1234yf/(R1234yf + R134a)} | \multicolumn{4}{c}{r = 100 * R1234yf/(R1234yf + R134a)} |
| --- | --- | --- | --- | --- | --- | --- | --- | --- | --- |
| Item |  | 0 | 25 | 50 | 75 | 0 | 25 | 50 | 75 |
| Point A | R32 | 57.5 | 56.5 | 55.5 | 54.6 | 58 | 57.3 | 56.6 | 55.9 |
|  | R125 | 27.3 | 28.7 | 30 | 31.3 | 28.3 | 29.4 | 30.4 | 31.4 |
|  | R1234yf + R134a | 11 | 10.6 | 10.3 | 9.9 | 8.2 | 7.8 | 7.5 | 7.2 |
|  | $CO_2$ | 4.2 | 4.2 | 4.2 | 4.2 | 5.5 | 5.5 | 5.5 | 5.5 |
| Approximate formula | R32 | \multicolumn{4}{c}{$-0.0388r + 57.48$} | \multicolumn{4}{c}{$-0.028r + 58$} |
|  | R125 | \multicolumn{4}{c}{$0.0532r + 27.33$} | \multicolumn{4}{c}{$0.0412r + 28.33$} |
|  | R1234yf | \multicolumn{4}{c}{$(100 - R32 - R125 - CO_2) * r/100$} | \multicolumn{4}{c}{$(100 - R32 - R125 - CO_2) * r/100$} |
|  | R134a | \multicolumn{4}{c}{$100 - R32 - R125 - R1234yf - CO_2$} | \multicolumn{4}{c}{$100 - R32 - R125 - R1234yf - CO_2$} |
| Approximate formula of R32 represented by using r and x | $CO_2$ | | | 4.2 | | | | 5.5 | |
|  | a | | | −0.0388 | | | | −0.0280 | |
|  | b | | | 57.4800 | | | | 58.0000 | |
|  | Approximate formula a | \multicolumn{8}{c}{$0.0083x - 0.0737$} |

TABLE 10-continued

|  | | r = 100 * R1234yf/(R1234yf + R134a) | | | | r = 100 * R1234yf/(R1234yf + R134a) | | | |
|---|---|---|---|---|---|---|---|---|---|
| Item | | 0 | 25 | 50 | 75 | 0 | 25 | 50 | 75 |
| and x | Approximate formula b | | | | $0.4x + 55.8$ | | | | |
| | Approximate formula of R32 | | | | $R32 = (0.0083x - 0.0737)r + (0.4x + 55.8)$ | | | | |
| Approximate formula of R125 represented by using r and x | $CO_2$ | | 4.2 | | | | 5.5 | | |
| | a | | 0.0532 | | | | 0.0412 | | |
| | b | | 27.3300 | | | | 28.3300 | | |
| | Approximate formula a | | | | $-0.0092x + 0.092$ | | | | |
| | Approximate formula b | | | | $0.7692x + 24.099$ | | | | |
| | Approximate formula of R125 | | | | $R125 = (-0.0092x + 0.092)r + (0.7692x + 24.099)$ | | | | |

$B_{r=0\ to\ 75}$ when 5.5 mass % ≥ x ≥ 4.2 mass % and 75 ≥ r ≥ 0

TABLE 11

|  | | r = 100 * R1234yf/(R1234yf + R134a) | | | | r = 100 * R1234yf/(R1234yf + R134a) | | | |
|---|---|---|---|---|---|---|---|---|---|
| Item | | 0 | 25 | 50 | 75 | 0 | 25 | 50 | 75 |
| Point B | R32 | 52.6 | 49.9 | 47.2 | 44.5 | 48.9 | 45.9 | 43 | 40.1 |
| | R125 | 25.4 | 27.7 | 30 | 32.3 | 24.9 | 27.5 | 30.2 | 32.9 |
| | R1234yf + R134a | 17.8 | 18.2 | 18.6 | 19 | 20.7 | 21.1 | 21.3 | 21.5 |
| | $CO_2$ | 4.2 | 4.2 | 4.2 | 4.2 | 5.5 | 5.5 | 5.5 | 5.5 |
| Approximate formula | R32 | | $-0.108r + 52.6$ | | | | $-0.1172r + 48.87$ | | |
| | R125 | | $0.092r + 25.4$ | | | | $0.1068r + 24.87$ | | |
| | R1234yf | | $(100 - R32 - R125 - CO_2) * r/100$ | | | | $(100 - R32 - R125 - CO_2) * r/100$ | | |
| | R134a | | $100 - R32 - R125 - R1234yf - CO_2$ | | | | $100 - R32 - R125 - R1234yf - CO_2$ | | |
| Approximate formula of R32 represented by using r and x | $CO_2$ | | 4.2 | | | | 5.5 | | |
| | a | | $-0.1080$ | | | | $-0.1172$ | | |
| | b | | 52.6000 | | | | 48.8700 | | |
| | Approximate formula a | | | | $-0.0071x - 0.0783$ | | | | |
| | Approximate formula b | | | | $-2.8692x + 64.651$ | | | | |
| | Approximate formula of R32 | | | | $R32 = (-0.0071x - 0.0783)r + (-2.8692x + 64.651)$ | | | | |
| R125 approximate formula represented by using r and x | $CO_2$ | | 4.2 | | | | 5.5 | | |
| | a | | 0.0920 | | | | 0.1068 | | |
| | b | | 25.4000 | | | | 24.8700 | | |
| | Approximate formula a | | | | $0.0114x + 0.0442$ | | | | |
| | Approximate formula b | | | | $-0.4077x + 27.112$ | | | | |
| | Approximate formula of R125 | | | | $R125 = (0.0114x + 0.0442)r + (-0.4077x + 27.112)$ | | | | |

$C_{r=0\ to\ 75}$ when 5.5 mass % ≥ x ≥ 4.2 mass % and 75 ≥ r ≥ 0

TABLE 12

|  | | r = 100 * R1234yf/(R1234yf + R134a) | | | | r = 100 * R1234yf/(R1234yf + R134a) | | | |
|---|---|---|---|---|---|---|---|---|---|
| Item | | 0 | 25 | 50 | 75 | 0 | 25 | 50 | 75 |
| Point C | R32 | 54.8 | 52.2 | 49.5 | 46.8 | 52.8 | 49.7 | 46.6 | 43.5 |
| | R125 | 22.1 | 24 | 25.9 | 27.8 | 18.5 | 20.8 | 23.1 | 25.4 |
| | R1234yf + R134a | 18.9 | 19.6 | 20.4 | 21.2 | 23.1 | 24.2 | 25 | 25.3 |
| | $CO_2$ | 4.2 | 4.2 | 4.2 | 4.2 | 5.5 | 5.5 | 5.5 | 5.5 |
| Approximate formula | R32 | | $-0.1068r + 54.83$ | | | | $-0.124r + 52.8$ | | |
| | R125 | | $0.076r + 22.1$ | | | | $0.092r + 18.5$ | | |
| | R1234yf | | $(100 - R32 - R125 - CO_2) * r/100$ | | | | $(100 - R32 - R125 - CO_2) * r/100$ | | |
| | R134a | | $100 - R32 - R125 - R1234yf - CO_2$ | | | | $100 - R32 - R125 - R1234yf - CO_2$ | | |

TABLE 12-continued

| | | \multicolumn{4}{c}{r = 100 * R1234yf/(R1234yf + R134a)} | \multicolumn{4}{c}{r = 100 * R1234yf/(R1234yf + R134a)} |
|---|---|---|---|---|---|---|---|---|---|
| Item | | 0 | 25 | 50 | 75 | 0 | 25 | 50 | 75 |
| Approximate formula of R32 represented by using r and x | $CO_2$ | | | 4.2 | | | | 5.5 | |
| | a | | | −0.1068 | | | | −0.1240 | |
| | b | | | 54.8300 | | | | 52.8000 | |
| | Approximate formula a | | | | −0.0132x − 0.0512 | | | | |
| | Approximate formula b | | | | −1.5615x + 61.388 | | | | |
| | Approximate formula of R32 | | | | R32 = (−0.0132x − 0.0512)r + (−1.5615x + 61.388) | | | | |
| Approximate formula of R125 represented by using r and x | $CO_2$ | | | 4.2 | | | | 5.5 | |
| | a | | | 0.0760 | | | | 0.0920 | |
| | b | | | 22.1000 | | | | 18.5000 | |
| | Approximate formula a | | | | 0.0123x + 0.0243 | | | | |
| | Approximate formula b | | | | −2.7692x + 33.731 | | | | |
| | Approximate formula of R125 | | | | R125 = (0.0123x + 0.0243)r + (−2.7692x + 33.731) | | | | |

The refrigerant according to the present disclosure preferably contains the sum of $CO_2$, R32, R125, R1234yf, and R134a in an amount of 50 to 100 mass %, based on the entire refrigerant. This makes it easier to obtain the effects of the composition according to the present disclosure. More specifically, the composition according to the present disclosure can more easily have a refrigerating capacity equivalent to that of R410A, and a GWP of 1500 or less, and be non-flammable. From this viewpoint, the refrigerant according to the present disclosure preferably contains the sum of $CO_2$, R32, R125, R1234yf, and R134a in an amount of 80 to 100 mass %, more preferably 90 to 100 mass %, even more preferably 99.5 to 100% by mass, and still even more preferably 99.9 to 100% by mass, based on the entire refrigerant. The refrigerant of the present disclosure may consist only of $CO_2$, R32, R125, R1234yf, and R134a.

The refrigerant according to the present disclosure may contain a refrigerant different from R32, R125, R134a, and 1234yf (additional refrigerant). The refrigerant according to the present disclosure may contain one or two or more kinds of additional refrigerants. The refrigerant according to the present disclosure may comprise any combination of additional refrigerants, regardless of the type. For example, additional refrigerants that belong to the additional refrigerants 1 to 3 described below may be contained in a combination.

The refrigerant according to the present disclosure may contain HCFC-1122, HCFC-124, CFC-1113, 3,3,3-trifluoropropine, and the like as additional refrigerant 1.

The refrigerant according to the present disclosure may contain as additional refrigerant 2 at least one halogenated organic compound represented by formula (1): $C_mH_nX_p$ (wherein each X independently represents a fluorine atom, a chlorine atom, or a bromine atom, m is 1 or 2, 2m+2≥n+p, and p≥1). The at least one halogenated organic compound as the additional refrigerant is not particularly limited. Preferable examples include difluorochloromethane, chloromethane, 2-chloro-1,1,1,2,2-pentafluoroethane, 2-chloro-1,1,1,2-tetrafluoroethane, 2-chloro-1,1-difluoroethylene, trifluoroethylene, and the like.

The refrigerant according to the present disclosure may contain as additional refrigerant 3 at least one organic compound represented by formula (2): $C_mH_nX_p$ (wherein each X independently represents an atom other than a halogen atom, m is 1 or 2, 2m+2 n+p, and p≥1). The at least one organic compound as the additional refrigerant is not particularly limited. Preferable examples include propane, isobutane, and the like.

2. Refrigerant Composition

The refrigerant composition according to the present disclosure comprises at least the refrigerant of the present disclosure. The refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The other component may be at least one selected from the group consisting of water, tracers, oxygen, air, impurities, and by-products. The refrigerant composition according to the present disclosure contains components other than the refrigerant in an amount of preferably 0 to 1 mass %, and more preferably 1 mass ppm to 0.1 mass %, based on the entire refrigerant composition.

The concentration of water contained in the refrigerant composition according to the present disclosure is preferably 200 mass ppm or less, based on the 1234y content of the refrigerant composition according to the present disclosure; the reason therefor is that this increases the stability of the refrigerant composition. The lower limit of the water concentration based on the 1234yf content of the mixture is not particularly limited, as long as the effect of improving the stability of the composition is exhibited. For example, the lower limit of the water concentration can be 0.1 mass ppm.

The presence of water in the mixture can provide an effect of increasing the chemical stability of the refrigerant composition according to the present disclosure. Although the present invention is not limited by theory, the reason for obtaining this effect is considered to be as follows. Because the refrigerant composition according to the present disclosure contains water, double bonds in the molecules of the unsaturated fluorinated hydrocarbons contained in the refrigerant composition can be stably present; and oxidation of the unsaturated fluorinated hydrocarbons is less likely to occur, consequently improving the stability of the refrigerant composition.

A tracer may be added to the composition according to the present disclosure at a detectable concentration such that when the composition has been diluted, contaminated, or undergone other changes, the changes can be traced. The tracer is not particularly limited. Examples of preferable tracers include hydrofluorocarbons, deuterated hydrocarbons, deuterated hydrofluorocarbons, perfluorocarbons, fluoroethers, brominated compounds, iodinated compounds, alcohols, aldehydes, ketones, nitrous oxide ($N_2O$), and the like. The tracer is particularly preferably a hydrofluorocarbon or a fluoroether.

When the refrigerant composition according to the present disclosure contains other components, the content of other components in the refrigerant, whether the other components are used singly or in a combination of two or more, is preferably 0.5 wt % or less, more preferably 0.3 wt % or less, and even more preferably 0.1 wt % or less, as the total content amount thereof.

3. Refrigeration Oil-Containing Working Fluid

The refrigeration oil-containing working fluid according to the present disclosure comprises at least the refrigerant or refrigerant composition according to the present disclosure and a refrigeration oil, and is for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition.

The composition of the refrigeration oil-containing working fluid of the present disclosure changes during the refrigeration cycle. More specifically, the refrigeration oil content of the refrigeration oil-containing working fluid of the present disclosure is relatively high in the compressor, and relatively low during the period of time when it is discharged from the compressor in a mist form and circulated through the refrigeration cycle before returning to the compressor. For example, the refrigeration oil content of the refrigeration oil-containing working fluid of the present disclosure is 30 to 70 mass % in the compressor; and is preferably 0 to 10 mass %, and more preferably 1 mass ppm to 20 mass %, during the period of time until the working fluid is discharged from the compressor and returned to the compressor again.

The refrigeration oil is not particularly limited, and can be suitably selected from commonly used refrigeration oils. In this case, a refrigerating oil that is more excellent in terms of its compatibility with the composition according to the present disclosure, as well as in terms of the effect of enhancing stability and the like of the composition according to the present disclosure, can be appropriately selected as desired.

The stability of the composition of the present disclosure as mixed with the refrigeration oil can be evaluated by a commonly used method without limitation. Examples of such methods include an evaluation method using the amount of free fluorine ions as an index according to ASHRAE Standard 97-2007, and the like. There is also another evaluation method using the total acid number as an index. This method can be performed, for example, according to ASTM D 974-06.

More specifically, the refrigeration oil is, for example, at least one refrigeration oil selected from the group consisting of polyalkylene glycols (PAG), polyol esters (POE), and polyvinyl ethers (PVE).

The refrigeration oil can be, for example, a refrigeration oil with a kinematic viscosity of 5 to 400 cSt at 40° C. When the kinematic viscosity is within this range, it is desirable in terms of lubrication.

The refrigeration oil may further contain at least one additive in addition to the base oil. The additive may be at least one member selected from the group consisting of UV fluorescent dyes, stabilizers, antioxidants, polymerization inhibitors, extreme-pressure agents, acid scavengers, oxygen scavengers, copper deactivators, rust inhibitors, oil agents, and antifoaming agents.

The refrigeration oil-containing working fluid according to the present disclosure may further optionally contain at least one additive. Examples of additives include compatibilizing agents and the like.

Preferable examples of compatibilizing agents include, but are not limited to, polyoxyalkylene glycol ethers, amides, nitriles, ketones, chlorocarbons, esters, lactones, aryl ethers, fluoroethers, 1,1,1-trifluoroalkanes, and the like. Polyoxyalkylene glycol ethers are particularly preferable.

Examples of ultraviolet fluorescent dyes include, but are not limited to, naphthalimide, coumarin, anthracene, phenanthrene, xanthene, thioxanthene, naphthoxanthene, fluorescein, and derivatives thereof. Either naphthalimide or coumarin, or both are particularly preferable.

Examples of stabilizers include, but are not limited to, (i) aliphatic nitro compounds such as nitromethane and nitroethane, and aromatic nitro compounds such as nitrobenzene and nitrostyrene; (ii) ethers such as 1,4-dioxane, amines such as 2,2,3,3,3-pentafluoropropylamine and diphenylamine; butylhydroxyxylene, benzotriazole, and the like. The stabilizers can be used singly, or in a combination of two or more.

The concentration of the stabilizer varies depending on the type of stabilizer, but can be selected within a range in which the properties of the composition are not impaired. The concentration of the stabilizer is usually preferably about 0.01 to 5 parts by mass, and more preferably about 0.05 to 2 parts by mass, per 100 parts by mass of the mixture.

Examples of polymerization inhibitors include, but are not limited to, 4-methoxy-1-naphthol, hydroquinone, hydroquinonemethyl ether, dimethyl-t-butylphenol, 2,6-di-tert-butyl-p-cresol, benzotriazole, and the like.

The concentration of the polymerization inhibitor is usually preferably 0.01 to 5 parts by mass, and more preferably about 0.05 to 2 parts by mass, per 100 parts by mass of the mixture.

2. Refrigeration Method

An object can be refrigerated by a refrigeration method comprising operating a refrigeration cycle using the composition according to the present disclosure. For example, the composition can be circulated via a compressor to form the refrigeration cycle.

It is also possible to obtain a device for forming a refrigeration cycle in which the above composition is circulated via a compressor. In a refrigeration method using such a device, because the composition ratio of R32, R125, R134a, and 1234yf contained in the mixture is the above specific composition ratio, the outlet temperature of the compressor can be set to, for example, 110° C. or less. When the composition comprises a refrigeration oil, the deterioration of the refrigeration oil can be suppressed by setting the outlet temperature of the compressor within this range.

3. Refrigerating Machine

Examples of refrigerating machines that can use the composition according to the present disclosure include, but are not limited to, refrigerators, freezers, water coolers, ice makers, refrigerated showcases, freezing showcases, freezing and refrigerating units, refrigerating machines used, for example, for freezing and refrigerating warehouses, chillers (chilling units), turbo refrigerators, screw refrigerators, and the like.

EXAMPLES

The present invention is described in detail below with reference to Examples and Comparative Examples. However, the present invention is not limited to the Examples.

Examples 1 to 79 and Comparative Example 1

The GWP of each of 401A and compositions comprising a mixture of R32, R125, R1234yf, R134a, and $CO_2$ was evaluated based on the values described in the Fourth Assessment Report of the Intergovernmental Panel on Climate Change (IPCC). The refrigerating capacity of each of R410A and the compositions comprising a mixture of R32, R125, R1234yf, and R134a was determined by performing refrigeration cycle theoretical calculations for the mixed refrigerants using the National Institute of Science and Technology (NIST) Reference Fluid Thermodynamic and Transport Properties Database (Refprop 9.0) under the following conditions.

Evaporation temperature −10° C.
Condensation temperature 40° C.
Superheating temperature 5 K
Supercooling temperature 5 K
Compressor efficiency 70%

Further, Tables 13 to 16 show the GWP, COP, and refrigerating capacity calculated based on these results. The COP and refrigerating capacity of each of the mixed refrigerants are shown in terms of the percentage relative to the COP and refrigerating capacity of R410A.

The coefficient of performance (COP) was determined in accordance with the following formula.

COP=(refrigerating capacity or heating capacity)/power consumption $CO_2$=2.8 mass %

TABLE 13

| Unit | Comp. Ex. 1-1 R410A | Comp. Ex. 1-2 O | Comp. Ex. 1-3 $P_{r=0}$ | Comp. Ex. 1-4 $P_{r=25}$ | Comp. Ex. 1-5 $P_{r=50}$ | Comp. Ex. 1-6 $P_{r=75}$ |
|---|---|---|---|---|---|---|
| mass % | 50.0 | 67.4 | 0.0 | 0.0 | 0.0 | 0.0 |
| mass % | 50.0 | 29.8 | 5.3 | 18.8 | 28.8 | 36.6 |
| mass % | 0.0 | 0.0 | 0.0 | 19.6 | 34.2 | 45.5 |
| mass % | 0.0 | 0.0 | 91.9 | 58.8 | 34.2 | 15.1 |
| mass % | 0.0 | 2.8 | 2.8 | 2.8 | 2.8 | 2.8 |
| — | 2088 | 1500 | 1500 | 1500 | 1500 | 1500 |
| % (relative to R410A) | 100 | 100 | 104 | 102 | 100 | 99 |
| % (relative to R410A) | 100 | 110 | 48 | 52 | 55 | 57 |

| Unit | Comp. Ex. 1-7 Q | Comp. Ex. 1-8 $R_{r=0}$ | Comp. Ex. 1-9 $R_{r=25}$ | Comp. Ex. 1-10 $R_{r=50}$ | Comp. Ex. 1-11 $R_{r=75}$ | Example 1-1 $A_{r=0-}B_{r=0-}C_{r=0}$ |
|---|---|---|---|---|---|---|
| mass % | 61.9 | 42.8 | 31.5 | 14.2 | 0.0 | 56.8 |
| mass % | 35.3 | 0.0 | 0.0 | 0.0 | 7.1 | 26.0 |
| mass % | 0.0 | 0.0 | 16.4 | 41.5 | 67.6 | 0.0 |
| mass % | 0.0 | 54.4 | 49.3 | 41.5 | 22.5 | 14.4 |
| mass % | 2.8 | 2.8 | 2.8 | 2.8 | 2.8 | 2.8 |
| — | 1653 | 1067 | 918 | 691 | 573 | 1500 |
| % (relative to 410A) | 100 | 103 | 103 | 103 | 101 | 101 |
| % (relative to R410A) | 109 | 79 | 73 | 61 | 49 | 100 |

| Unit | Example 1-2 $A_{r=25}$ | Example 1-3 $A_{r=50}$ | Example 1-4 $A_{r=75}$ | Example 1-5 $B_{r=25}$ | Example 1-6 $B_{r=50}$ | Example 1-8 $B_{r=75}$ |
|---|---|---|---|---|---|---|
| mass % | 55.5 | 54.2 | 53.0 | 54.4 | 52.0 | 49.5 |
| mass % | 27.8 | 29.6 | 31.3 | 27.8 | 29.6 | 31.6 |
| mass % | 3.5 | 6.7 | 9.7 | 3.8 | 7.8 | 12.1 |
| mass % | 10.4 | 6.7 | 3.2 | 11.2 | 7.8 | 4.0 |
| mass % | 2.8 | 2.8 | 2.8 | 2.8 | 2.8 | 2.8 |
| — | 1500 | 1500 | 1500 | 1500 | 1500 | 1500 |
| % (relative to R410A) | 100 | 100 | 100 | 100 | 100 | 100 |
| % (relative to R410A) | 101 | 102 | 102 | 100 | 100 | 100 |

| Unit | Example 1-9 $C_{r=25}$ | Example 1-10 $C_{r=50}$ | Example 1-11 $C_{r=75}$ |
|---|---|---|---|
| mass % | 54.7 | 52.6 | 67.4 |
| mass % | 27.3 | 28.6 | 29.8 |
| mass % | 3.8 | 8.0 | 0.0 |
| mass % | 11.4 | 8.0 | 0.0 |
| mass % | 2.8 | 2.8 | 2.8 |

TABLE 13-continued

|  |  | 1488 | 1471 | 1498 |
| --- | --- | --- | --- | --- |
| % (relative to R410A) |  | 100 | 100 | 100 |
| % (relative to R410A) |  | 100 | 100 | 110 |

$CO_2 = 4.2\%$

TABLE 14

| Item | Unit | Comp. Ex. 1-1 R410A | Comp. Ex. 2-1 O | Comp. Ex. 2-2 $P_{r=0}$ | Comp. Ex. 2-3 $P_{r=25}$ | Comp. Ex. 2-4 $P_{r=50}$ | Comp. Ex. 2-5 $P_{r=75}$ |
| --- | --- | --- | --- | --- | --- | --- | --- |
| R32 | mass % | 50.0 | 65.6 | 0.0 | 0.0 | 0.0 | 0.0 |
| R125 | mass % | 50.0 | 30.2 | 6.2 | 19.4 | 29.2 | 36.8 |
| R1234yf | mass % | 0.0 | 0.0 | 0.0 | 19.1 | 33.3 | 44.3 |
| R134a | mass % | 0.0 | 0.0 | 89.6 | 57.3 | 33.3 | 14.7 |
| $CO_2$ | mass % | 0.0 | 4.2 | 4.2 | 4.2 | 4.2 | 4.2 |
| GWP | — | 2088 | 1500 | 1500 | 1500 | 1500 | 1500 |
| Relative COPc | % (relative to R410A) | 100 | 100 | 103 | 101 | 100 | 99 |
| Relative cooling Capacity | % (relative to R410A) | 100 | 112 | 52 | 56 | 59 | 60 |

| Item | Unit | Comp. Ex. 2-6 Q | Comp. Ex. 2-7 $R_{r=0}$ | Comp. Ex. 2-8 $R_{r=25}$ | Comp. Ex. 2-9 $R_{r=50}$ | Comp. Ex. 2-10 $R_{r=75}$ | Example 2-1 $A_{r=0}$ |
| --- | --- | --- | --- | --- | --- | --- | --- |
| R32 | mass % | 61.4 | 42.8 | 31.7 | 14.8 | 0.0 | 57.5 |
| R125 | mass % | 34.4 | 0.0 | 0.0 | 0.0 | 6.5 | 27.3 |
| R1234yf | mass % | 0.0 | 0.0 | 16.0 | 40.5 | 67.0 | 0.0 |
| R134a | mass % | 0.0 | 53.0 | 48.1 | 40.5 | 22.3 | 11.0 |
| $CO_2$ | mass % | 4.2 | 4.2 | 4.2 | 4.2 | 4.2 | 4.2 |
| GWP | — | 1618 | 1047 | 902 | 681 | 549 | 1500 |
| Relative COPc | % (relative to R410A) | 99 | 103 | 103 | 102 | 101 | 100 |
| Relative cooling Capacity | % (relative to R410A) | 111 | 82 | 77 | 65 | 52 | 105 |

| Item | Unit | Example 2-2 $A_{r=25}$ | Example 2-3 $A_{r=50}$ | Example 2-4 $A_{r=75}$ | Example 2-5 $B_{r=0}$ | Example 2-6 $B_{r=25}$ | Example 2-7 $B_{r=50}$ |
| --- | --- | --- | --- | --- | --- | --- | --- |
| R32 | mass % | 56.5 | 55.5 | 54.6 | 52.6 | 49.9 | 47.2 |
| R125 | mass % | 28.7 | 30.0 | 31.3 | 25.4 | 27.7 | 30.0 |
| R1234yf | mass % | 2.7 | 5.2 | 7.4 | 0.0 | 4.6 | 9.3 |
| R134a | mass % | 7.9 | 5.1 | 2.5 | 17.8 | 13.6 | 9.3 |
| $CO_2$ | mass % | 4.2 | 4.2 | 4.2 | 4.2 | 4.2 | 4.2 |
| GWP | — | 1500 | 1500 | 1500 | 1500 | 1500 | 1500 |
| Relative COPc | % (relative to R410A) | 100 | 100 | 100 | 100 | 100 | 100 |
| Relative cooling Capacity | % (relative to R410A) | 105 | 106 | 106 | 100 | 100 | 100 |

| Item | Unit | Example 2-8 $B_{r=75}$ | Example 2-9 $C_{r=0}$ | Example 2-10 $C_{r=25}$ | Example 2-11 $C_{r=50}$ | Example 2-12 $C_{r=75}$ |
| --- | --- | --- | --- | --- | --- | --- |
| R32 | mass % | 44.6 | 54.8 | 52.2 | 49.5 | 46.8 |
| R125 | mass % | 32.3 | 22.1 | 24.0 | 25.9 | 27.8 |
| R1234yf | mass % | 14.2 | 0.0 | 4.9 | 10.2 | 15.9 |
| R134a | mass % | 4.7 | 18.9 | 14.7 | 10.2 | 5.3 |
| $CO_2$ | mass % | 4.2 | 4.2 | 4.2 | 4.2 | 4.2 |
| GWP | — | 1500 | 1414 | 1403 | 1387 | 1365 |
| Relative COPc | % (relative to R410A) | 99 | 100 | 100 | 100 | 100 |
| Relative cooling Capacity | % (relative to R410A) | 100 | 100 | 100 | 100 | 100 |

$CO_2 = 5.5\%$

TABLE 15

| Item | Unit | Comp. Ex. 1-1 R410A | Comp. Ex. 3-1 O | Comp. Ex. 3-2 $P_{r=0}$ | Comp. Ex. 3-3 $P_{r=25}$ | Comp. Ex. 3-4 $P_{r=50}$ | Comp. Ex. 3-5 $P_{r=75}$ |
|---|---|---|---|---|---|---|---|
| R32 | mass % | 50.0 | 64.0 | 0.0 | 0.0 | 0.0 | 0.0 |
| R125 | mass % | 50.0 | 30.5 | 7.1 | 19.9 | 29.5 | 36.9 |
| R1234yf | mass % | 0.0 | 0.0 | 0.0 | 18.7 | 32.5 | 43.2 |
| R134a | mass % | 0.0 | 0.0 | 87.4 | 55.9 | 32.5 | 14.4 |
| $CO_2$ | mass % | 0.0 | 5.5 | 5.5 | 5.5 | 5.5 | 5.5 |
| GWP | — | 2088 | 1500 | 1500 | 1500 | 1500 | 1500 |
| Relative COPc | % (relative to R410A) | 100 | 99 | 102 | 101 | 99 | 98 |
| Relative cooling Capacity | % (relative to R410A) | 100 | 115 | 55 | 59 | 62 | 64 |

| Item | Unit | Comp. Ex. 3-6 Q | Comp. Ex. 3-7 $R_{r=0}$ | Comp. Ex. 3-8 $R_{r=25}$ | Comp. Ex. 3-9 $R_{r=50}$ | Comp. Ex. 3-10 $R_{r=75}$ | Example 3-1 $A_{r=0}$ |
|---|---|---|---|---|---|---|---|
| R32 | mass % | 60.9 | 42.7 | 31.9 | 15.4 | 0.0 | 58.0 |
| R125 | mass % | 33.6 | 0.0 | 0.0 | 0.0 | 5.9 | 28.3 |
| R1234yf | mass % | 0.0 | 0.0 | 15.7 | 39.6 | 66.5 | 0.0 |
| R134a | mass % | 0.0 | 51.8 | 46.9 | 39.5 | 22.1 | 8.2 |
| $CO_2$ | mass % | 5.5 | 5.5 | 5.5 | 5.5 | 5.5 | 5.5 |
| GWP | — | 1587 | 1029 | 887 | 670 | 525 | 1500 |
| Relative COPc | % (relative to 410A) | 99 | 102 | 102 | 102 | 100 | 99 |
| Relative cooling capacity | % (relative to R410A) | 114 | 85 | 80 | 68 | 55 | 109 |

| Item | Unit | Example 3-2 $A_{r=25}$ | Example 3-3 $A_{r=50}$ | Example 3-4 $A_{r=75}$ | Example 3-5 $B_{r=0}$ | Example 3-6 $B_{r=25}$ | Example 3-7 $B_{r=50}$ |
|---|---|---|---|---|---|---|---|
| R32 | mass % | 57.3 | 56.6 | 55.9 | 48.9 | 45.9 | 43.0 |
| R125 | mass % | 29.4 | 30.4 | 31.4 | 24.9 | 27.5 | 30.2 |
| R1234yf | mass % | 2.0 | 3.8 | 5.4 | 0.0 | 5.3 | 10.7 |
| R134a | mass % | 5.8 | 3.7 | 1.8 | 20.7 | 15.8 | 10.6 |
| $CO_2$ | mass % | 5.5 | 5.5 | 5.5 | 5.5 | 5.5 | 5.5 |
| GWP | — | 1500 | 1500 | 1500 | 1500 | 1500 | 1500 |
| Relative COPc | % (relative to R410A) | 99 | 99 | 99 | 100 | 100 | 99 |
| Relative Cooling Capacity | % (relative to R410A) | 109 | 110 | 110 | 100 | 100 | 100 |

| Item | Unit | Example 3-8 $B_{r=75}$ | Example 3-9 $C_{r=0}$ | Example 3-10 $C_{r=25}$ | Example 3-11 $C_{r=50}$ | Example 3-12 $C_{r=75}$ |
|---|---|---|---|---|---|---|
| R32 | mass % | 40.1 | 52.8 | 49.7 | 46.6 | 43.5 |
| R125 | mass % | 32.9 | 18.5 | 20.8 | 23.1 | 25.4 |
| R1234yf | mass % | 16.1 | 0.0 | 6.0 | 12.4 | 19.2 |
| R134a | mass % | 5.4 | 23.2 | 18.0 | 12.4 | 6.4 |
| $CO_2$ | mass % | 5.5 | 5.5 | 5.5 | 5.5 | 5.5 |
| GWP | — | 1500 | 1336 | 1321 | 1301 | 1275 |
| Relative COPc | % (relative to R410A) | 99 | 100 | 100 | 100 | 99 |
| Relative cooling capacity | % (relative to 410A) | 100 | 100 | 100 | 100 | 100 |

DESCRIPTION OF REFERENCE NUMERALS

1: Ignition source
2: Sample inlet
3: Springs
4: 12-Liter glass flask
5: Electrodes
6: Stirrer
7: Insulated chamber
O: A composition ratio when the GWP is 1500 and the concentration of (R1234yf+R134a) (mass %) is 0 mass %.
P: A composition ratio when the GWP is 1500 and the concentration of R32 (mass %) is 0 mass %.
Q: A composition ratio when the WCF composition is non-flammable and the concentration of (R1234yf+R134a) (mass %) is 0 mass %.
R: A composition ratio when the WCF composition is non-flammable and the concentration of R32 (mass %) is 0 mass % or the concentration of R125 (mass %) is 0 mass %.
A: A composition ratio at the intersection of line segment OP and line segment QR.

B: A composition ratio when the GWP is 1500 and the refrigerating capacity is 100% relative to that of R410A.

C: A composition ratio when the WCF composition is non-flammable and the refrigerating capacity is 100% relative to that of R410A.

$A_{r=50}$: Point A when r=50=100×concentration (%) of R1234yf/(concentration (%) of R1234yf+concentration (%) of R134a)

$A_{r=0\ to\ Y}$: Point A indicated by the function or r when r is in the range of 0 to Y.

The invention claimed is:

1. A composition comprising a refrigerant, the refrigerant comprising $CO_2$, difluoromethane (R32), pentafluoroethane (R125), 2,3,3,3-tetrafluoro-1-propene (R1234yf), and 1,1,1,2-tetrafluoroethane (R134a), wherein when the mass % of $CO_2$ based on the sum of $CO_2$, R32, R125, R1234yf, and R134a in the refrigerant is x, the mass % of R1234yf based on the sum of R1234yf and R134a is r, and the mass % of R32, the mass % of R125, and the mass % of the sum of R1234yf and R134a based on the sum of $CO_2$, R32, R125, R1234yf, and R134a are respectively represented by a, b, and c, the refrigerant satisfies the following requirements (1) or (2):

(1) 4.2>x≥2.8;

75≥r≥0; and coordinates (a, b, c) in a ternary composition diagram whose vertices are a point of (100−x) mass % of R32, a point of (100−x) mass % of R125, and a point of (100−x) mass % of the sum of R1234yf and R134a are within a triangular region surrounded by line segments that connect the following points:

point A [(0.0086x−0.0748)r+0.5x+55.38, (−0.0126x+0.106)r+0.9357x+23.4, 100−a−b−x], point B [(−0.0077x−0.0756)r−3.0143x+65.26, (0.0126x+0.0392)r+(−0.4x+27.08), 100−a−b−x], and point C [(−0.0154x−0.042)r−1.4214x+60.8, (0.0171x+0.004)r−2.7857x+33.8, 100−a−b−x], or on the line segments, or (2) 5.5%≥x≥4.2%;

75≥r≥0; and coordinates (a, b, c) in a ternary composition diagram whose vertices are a point of (100−x) mass % of R32, a point of (100−x) mass % of R125, and a point of (100−x) mass % of the sum of R1234yf and R134a are within a triangular region surrounded by line segments that connect the following points:

point A [(0.0083x−0.0737)r+0.4x+55.8, (−0.0092x+0.092)r+0.7692x+24.099, 100−a−b−x], point B [(−0.0071x−0.0783)r−2.8692x+64.651, (0.0114x+0.0442)r−0.4077x+27.112, 100−a−b−x], and point C [(−0.0132x−0.0512)r+(−1.5615x+61.388), (0.0123x+0.0243)r+(−2.7692x+33.731), 100−a−b−x], or on the line segments.

2. The composition according to claim 1, wherein the composition is for use as an alternative refrigerant for R404A or R410A.

3. The composition according to claim 1, further comprising at least one additive selected from the group consisting of tracers, compatibilizing agents, ultraviolet fluorescent dyes, stabilizers, and polymerization inhibitors.

4. The composition according to claim 1, further comprising a refrigeration oil.

5. The composition according to claim 4, wherein the refrigeration oil contains at least one polymer selected from the group consisting of polyalkylene glycol (PAG), polyol ester (POE), and polyvinyl ether (PVE).

6. A refrigeration method comprising operating a refrigeration cycle using the composition of claim 1 as a working fluid.

7. A refrigerating machine comprising the composition of claim 1 as a working fluid.

8. The composition according to claim 1, which is for use as a working fluid in at least one member selected from the group consisting of a refrigerator, a freezer, a water cooler, an ice maker, a refrigerating showcase, a freezing showcase, a freezing and refrigerating unit, a refrigerating machine for freezing and refrigerating warehouses, a chiller (chilling unit), a turbo refrigerator, and a screw refrigerator.

* * * * *